(12) United States Patent
Sugishita et al.

(10) Patent No.: US 11,427,243 B2
(45) Date of Patent: Aug. 30, 2022

(54) STEERING DEVICE

(71) Applicant: NSK Ltd., Tokyo (JP)

(72) Inventors: Suguru Sugishita, Maebashi (JP);
Masaru Oosawa, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 17/299,915

(22) PCT Filed: Nov. 29, 2019

(86) PCT No.: PCT/JP2019/046839
§ 371 (c)(1),
(2) Date: Jun. 4, 2021

(87) PCT Pub. No.: WO2020/116350
PCT Pub. Date: Jun. 11, 2020

(65) Prior Publication Data
US 2022/0032989 A1 Feb. 3, 2022

(30) Foreign Application Priority Data
Dec. 5, 2018 (JP) .............................. JP2018-227842

(51) Int. Cl.
*B62D 1/184* (2006.01)
*B62D 1/185* (2006.01)

(52) U.S. Cl.
CPC .............. *B62D 1/184* (2013.01); *B62D 1/185* (2013.01)

(58) Field of Classification Search
CPC .................................. B62D 1/184; B62D 1/185
See application file for complete search history.

(56) References Cited

U.S. PATENT DOCUMENTS

2017/0313343 A1  11/2017  Kim et al.
2018/0229757 A1  8/2018  Yamaoka et al.
(Continued)

FOREIGN PATENT DOCUMENTS

CN  203544097 A  4/2014
CN  108622179 A  10/2018
(Continued)

OTHER PUBLICATIONS

International Search Report (PCT/ISA/210) issued in PCT Application No. PCT/JP2019/046839 dated Feb. 4, 2020 with English translation (six (6) pages).
(Continued)

*Primary Examiner* — Drew J Brown
(74) *Attorney, Agent, or Firm* — Crowell & Moring LLP

(57) ABSTRACT

An outer column includes first tightened surfaces arranged in a pair of clamped portions, second tightened surfaces arranged at a portion below the first tightened surfaces and with high rigidity in the width direction, and third tightened surfaces arranged in a portion above the first tightened surfaces and with high rigidity in the width direction. A pair of support plate portions of an upper bracket each has reinforcing portions arranged in both end portions in the front-rear direction, extending in the vertical direction, and each having a free end in the upper-end portion, and a stepped portion arranged in the intermediate portion in the front-rear direction, and having a concave shape on the width direction outside, a convex shape on the width direction inside, and an inside surface in the width direction facing and capable of being brought into contact only with the third tightened surfaces.

4 Claims, 27 Drawing Sheets

(56) References Cited

U.S. PATENT DOCUMENTS

2019/0152506 A1    5/2019  Shiroishi
2020/0189642 A1    6/2020  Sugishita et al.

FOREIGN PATENT DOCUMENTS

| CN | 109795542 A | * | 5/2019 | ............ B62D 1/184 |
| JP | 2014083906 A | * | 5/2014 | |
| JP | 2017 132323 A | | 8/2017 | |
| JP | 2017-197178 A | | 11/2017 | |
| JP | 2018-130996 A | | 8/2018 | |
| JP | 2019-93737 A | | 6/2019 | |
| KR | 10-2016-0092658 A | | 8/2016 | |
| WO | WO 2016/186149 A1 | | 11/2016 | |
| WO | WO-2017068804 A1 | * | 4/2017 | ............ B62D 1/185 |
| WO | WO 2019/189471 A1 | | 10/2019 | |

OTHER PUBLICATIONS

Japanese-language Written Opinion (PCT/ISA/237) issued in PCT Application No. PCT/JP2019/046839 dated Feb. 4, 2020 (four (4) pages).

* cited by examiner

STEERING DEVICE

TECHNICAL FIELD

The present invention relates to a steering device for giving a steering angle to steered wheels of a vehicle such as an automobile or the like.

BACKGROUND ART

A steering device that is assembled in a vehicle such as an automobile or the like transmits the movement of a steering wheel that is operated by a driver to a steering gear unit via a steering shaft, and gives a steering angle to left and right steered wheels. The steering device includes a position adjustment mechanism for enabling adjustment of the position of a steering wheel in accordance with a physique and a driving posture of a driver.

FIG. 23 to FIG. 25 illustrate a steering device including a position adjustment mechanism of a steering wheel as described in WO 2016/186149(A1). A steering device 1 includes a steering shaft 2 to which a steering wheel (not illustrated) is fixed at the rear-end portion, and a steering column 3 that rotatably supports the steering shaft 2 on the inner side via a plurality of rolling bearings.

The front-side portion of the steering column 3 is supported by a lower bracket 4, and the intermediate portion in the front-rear direction of the steering column 3 is supported by an upper bracket 5. The lower bracket 4 and the upper bracket 5 are supported by a vehicle body 6. In the front-side portion of the steering column 3, an electric assist device 7 for reducing a force for operating the steering wheel is arranged.

In order to enable adjustment of a front-rear position of the steering wheel, the steering column 3 is configured so that the entire length may be expanded or contracted by fitting together the rear-side portion of an inner column 8, which is arranged on the front side, with the front-side portion of an outer column 9, which is arranged on the rear side, so that relative displacement is possible in the axial direction. The outer column 9 is supported by the upper bracket 5 so as to be able to move in the front-rear direction. The steering shaft 2 is configured by combining an inner shaft 10 and an outer shaft 11 with a spline engagement or the like so as to be able to transmit torque and to be able to extend or contract.

In order to enable adjustment of a vertical position of the steering wheel, the steering column 3 is supported by the lower bracket 4 so as to be able to pivotally displace about a tilt shaft 12 that is arranged in the width direction. The outer column 9 is supported by the upper bracket 5 so as to be able to move in the vertical direction.

In the steering device 1, securing strength of the outer column 9 and securing a holding force of the inner column 8 by the outer column 9 are achieved compatibly. The outer column 9 includes a sandwiched portion 13, which is arranged on the front half portion, and a cylindrical portion 14, which is arranged on the rear half portion. The sandwiched portion 13 includes a substantially cylindrical column body portion 15, which is arranged on the upper-side portion and is externally fitted onto the inner column 8, and a substantially box-shaped reinforcing bridge portion 16, which is arranged on the lower-side portion and is integrally formed with the column body portion 15.

The column body portion 15 includes a front-rear direction slit 17 on the lower surface, which extends in the front-rear direction. The column body portion 15 includes a front-side circumferential-direction slit 18 and a rear-side circumferential-direction slit 19 respectively arranged on the front-side portion and the rear-side portion of the lower half portion, which cross the front-rear direction slit 17 in the circumferential direction. The column body portion 15 includes a pair of clamped portions 20 on portions surrounded on the three sides by the front-rear direction slit 17, the front-side circumferential-direction slit 18 and the rear-side circumferential-direction slit 19. The pair of clamped portions 20 includes first tightened surfaces 22 on the lower end portions of the outside surfaces in the width direction, which receive a tightening force from the inside surfaces in the width direction of a pair of support plate portions 21 of the upper bracket 5.

The reinforcing bridge portion 16 is arranged so as to cover the pair of clamped portions 20 via a substantially U-shaped gap 23 when viewed from the width direction, which includes a bottom plate portion 24, a front-side connecting portion 25, and a rear-side connecting portion 26. The bottom plate portion 24 extends in the front-rear direction and the width direction and is arranged below the pair of clamped portions 20 via a long hole for telescopic adjustment 27, which extends in the front-rear direction and constitutes the lower side of the substantially U-shaped gap 23. The bottom plate portion 24 includes second tightened surfaces 28 on the lower-side portions of both-side surfaces in the width direction thereof, which receive a tightening force from the inside surfaces in the width direction of the pair of support plate portions 21. The front-side connecting portion 25 connects a front-end portion of the bottom plate portion 24 and a portion of the lower surface of the column body portion 15 that is adjacent to the front side of the front-side circumferential-direction slit 18. The rear-side connecting portion 26 connects the rear-end portion of the bottom plate portion 24 and a portion of the lower surface of the column body portion 15 that is adjacent to the rear side of the rear-side circumferential-direction slit 19.

The column body portion 15 includes protruding portions 29, which protrude outward in the width direction, on portions of both-side surfaces in the width direction thereof that overlap the central axis of the outer column 9 in the vertical direction. The protruding portions 29 include third tightened surfaces 30 on the tip-end portions, which receive a tightening force from the inside surfaces in the width direction of the pair of support plate portions 21.

As illustrated in FIG. 25, in a state where a pressing force is not applied from the support plate portions 21 to the sandwiched portion 13 of the outer column 9, an interval W1 in the width direction between the first tightened surfaces 22, an interval W2 in the width direction between the second tightened surfaces 28 and an interval W3 in the width direction between the third tightened surfaces 30 are regulated so as to satisfy a relation of $W1=W3>W2$. Due to this, the second tightened surfaces 28 are located further inward in the width direction than the first tightened surfaces 22 and the third tightened surfaces 30.

The upper bracket 5 includes a mounting plate portion 31, which is supported by the vehicle body 6 so as to be able to be released toward the front, and the pair of support plate portions 21 having a flat plate shape, which are arranged on both sides in the width direction of the sandwiched portion 13. The pair of support plate portions 21 includes tilt adjusting long holes 32 that extend in the vertical direction.

In the steering device 1, by operating an adjustment lever 34, which is arranged in the end portion of an adjustment rod 33 that is inserted through the long hole for telescopic adjustment 27 and the tilt adjusting long holes 32 in the width direction, a dimension in the axial direction of a cam device 35 is expanded or contracted, so that an interval between the inside surfaces in the width direction of the pair of support plate portions 21 is expanded or contracted. As a result, a tightening force of the inside surfaces in the width direction of the pair of support plate portions 21 to the first tightened surfaces 22, the second tightened surfaces 28, and the third tightened surfaces 30 is adjusted. In a clamped state where the interval between the inside surfaces in the width direction of the pair of support plate portions 21 is reduced, the pair of clamped portions 20 elastically deforms toward the inside in the width direction so as to sandwich the outer-circumferential surface of the inner column 8 from both sides in the width direction. Due to this, position adjustment of the steering wheel becomes impossible. In an unclamped state where the interval between the inside surfaces in the width direction of the pair of support plate portions 21 is increased, the pair of clamped portions 20 elastically restores so that a force for holding the outer-circumferential surface of the inner column 8 is reduced. Due to this, adjustment of the front-rear position and vertical position of the steering wheel becomes possible within a range where the adjustment rod 33 is able to move inside the long hole for telescopic adjustment 27 and the tilt adjusting long holes 32.

The second tightened surfaces 28 and the third tightened surfaces 30 are provided on portions with higher rigidity in the width direction compared to the clamped portions 20 on which the first tightened surfaces 22 are provided. Thereby, when the interval between the inside surfaces in the width direction of the pair of support plate portions 21 is reduced, it is possible to largely bend the pair of clamped portions 20 in the width direction. When a torque is applied to the outer column 9, such as when the steering wheel is operated with a large force in a state where a steering lock device is activated, the torque may be transmitted from the outer column 9 to the pair of support plate portions 21 by way of the second tightened surfaces 28 and the third tightened surfaces 30. As a result, securing strength of the outer column 9 is compatible with securing holding force of the inner column 8.

In order to prevent the pair of support plate portions from being plastically deformed even when a torque (torsional torque) is applied from the outer column to the pair of support plate portions, such as when the steering wheel is operated with a large force in a state where a steering lock device is activated, it has been proposed that a reinforcing portion is provided in the pair of support plate portions. FIG. 26 illustrates an upper bracket 5*a* as described in JP 2017-197178(A). The pair of support plate portions 21*a* of the upper bracket 5*a* has front-side reinforcing portions 36 on the front-end portion, which extend in the vertical direction, and rear-side reinforcing portions 37 on the rear-end portion, which extend in the vertical direction. The upper-end portions of the front-side reinforcing portions 36 are not connected to the lower surface of the mounting plate portion 31*a* of the upper bracket 5*a*, and thus have free ends. Similarly, the upper-end portions of the rear-side reinforcing portions 37 are not connected to the lower surface of the mounting plate portion 31*a*, and thus have free ends. The inside surfaces in the width direction of the intermediate portions in the front-rear direction of the pair of support plate portions 21*a* are configured by stepless flat surfaces.

The pair of support plate portions 21*a* includes the front-side reinforcing portions 36 and the rear-side reinforcing portions 37 on both end portions in the front-rear direction thereof, so that bending rigidity in the width direction thereof is improved. Therefore, by combining the upper bracket 5*a* with the outer column 9 illustrated in FIG. 24 and FIG. 25, support rigidity in the width direction of the outer column 9 can be enhanced.

CITATION LIST

Patent Literature

[Patent Literature 1] WO 2016/186149(A1)
[Patent Literature 2] JP 2017-197178(A)

SUMMARY OF INVENTION

Technical Problem

However, when the upper bracket 5*a* including the front-side reinforcing portions 36 and the rear-side reinforcing portions 37 is combined with the outer column 9 illustrated in FIG. 24 and FIG. 25, there is a possibility that the following problems may occur. The problems will be described with reference to FIG. 27. A left half section of FIG. 27 illustrates a state of one support plate portion of the pair of support plate portions 21*a* before the deformation, and a right half section of FIG. 27 illustrates, in an exaggerated manner, a state of the other support plate portion of the pair of support plate portions 21*a* after the deformation.

In the outer column 9, the second tightened surfaces 28, which are arranged on the lower side, are located further inward than the first tightened surfaces 22 and the third tightened surfaces 30 in the width direction. Therefore, when the dimension in the axial direction of the cam device 35 is increased by operating the adjustment lever 34, the pair of support plate portions 21*a* is inclined further inward in the width direction as going toward the lower side, as illustrated in the right half section of FIG. 27. When the dimension in the axial direction of the cam device 35 is further increased, the pair of support plate portions 21*a* is bent and deformed respectively with a portion that is in contact with the first tightened surfaces 22 as a fulcrum, such that portions of the pair of support plate portions 21*a* facing the third tightened surfaces 30 are opened outward in the width direction. As a result, there is a possibility that a gap may be generated respectively between the third tightened surfaces 30 and the inside surfaces in the width direction of the pair of support plate portions 21*a*. When a gap is generated respectively between the third tightened surfaces 30 and the inside surfaces in the width direction of the pair of support plate portions 21*a*, it becomes difficult to sufficiently secure the support rigidity of the outer column 9.

An object of the present invention is to provide a steering device in which support rigidity in the width direction of an outer column when supported by a support bracket is sufficiently secured.

Solution to Problem

The steering device of one aspect of the present invention includes an inner column, an outer column, and a support bracket. The outer column is arranged on the rear side of the inner column and is externally fitted onto the inner column so that relative displacement is possible in the axial direction.

The support bracket has a mounting plate portion that is to be supported by a vehicle body, and a pair of support plate portions that has upper end portions fixed to a lower surface of the mounting plate portion, and that is arranged on both sides in a width direction of the outer column.

The outer column includes a pair of clamped portions that is arranged on both sides in the width direction of the inner column and is configured to sandwich the inner column from both sides in the width direction due to elastic deformation in the width direction, and first tightened surfaces, second tightened surfaces and third tightened surfaces that are configured to receive a tightening force from inside surfaces in the width direction of the pair of support plate portions.

The first tightened surfaces are arranged on outside surfaces in the width direction of the pair of clamped portions. The second tightened surfaces are arranged on both sides in the width direction of a portion of the outer column below the first tightened surfaces and with higher rigidity with respect to the width direction than the pair of clamped portions. The third tightened surfaces are arranged on both sides in the width direction of a portion of the outer column above the first tightened surfaces and with higher rigidity with respect to the width direction than the pair of clamped portions.

A width dimension between the first tightened surfaces and a width dimension between the third tightened surfaces are equal to each other, and are larger than a width dimension between the second tightened surfaces.

At least one support plate portion of the pair of support plate portions includes reinforcing portions that are arranged on both end portions in a front-rear direction thereof, that extend in a vertical direction, and have a free ends on the upper end portion, and a stepped portion that is arranged in an intermediate portion in the front-rear direction thereof, and has a concave shape on the outer side in the width direction, a convex shape on the inner side in the width direction, and an inside surface in the width direction that faces one of the third tightened surfaces and is configured to be brought in contact with only the one of the third tightened surfaces.

Both support plate portions of the pair of support plate portions may include the reinforcing portions and the stepped portion.

The at least one support plate portion may include an auxiliary stepped portion that is arranged on the intermediate portion in the front-rear direction, and that has a concave shape on the outer side in the width direction and a convex shape on the inner side in the width direction, and the stepped portion may be provided in a part of the auxiliary stepped portion.

The outer column may include a long hole for telescopic adjustment that is located between the first tightened surfaces and the second tightened surfaces and extends in the front-rear direction, and the pair of support plate portions may include tilt adjusting long holes that extend in the vertical direction. An adjustment rod may be inserted through the long hole for telescopic adjustment and the tilt adjusting long holes in the width direction. The outer column may be configured to move in the vertical direction and the front-rear direction with respect to the support bracket within a range where the adjustment rod is able to move inside the long hole for telescopic adjustment and the tilt adjusting long holes. The inside surface in the width direction of the stepped portion may be arranged so as to be able to be brought in contact with the one of the third tightened surfaces, regardless of a support position of the outer column with respect to the support bracket.

Effect of Invention

The present invention provides a steering device in which support rigidity in the width direction of an outer column when supported by a support bracket is improved.

BRIEF DESCRIPTION OF DRAWINGS

FIG. 19(A) illustrating a neutral position of the outer column, FIG. 19(B) illustrating a case in which the outer column has been moved to the upper side, and FIG. 19(C) illustrating a case in which the outer column has been moved to the lower side.

FIG. 20(A) illustrating a neutral position of the outer column, FIG. 20(B) illustrating a case in which the outer column has been moved to the front side, and FIG. 20(C) illustrating a case in which the outer column has been moved to the rear side.

DESCRIPTION OF EMBODIMENTS

First Example

A first example of an embodiment of the present invention will be described using FIG. 1 to FIG. 21. A steering device 1a of this example is characterized by a structure of an inner column 8a, an outer column 9a, and an upper bracket 5b that corresponds to a support bracket, which are components of the steering device 1a. The inner column 8a is arranged on the front side (lower side), and the outer column 9a is arranged on the rear side (upper side) of the inner column 8a. A steering column 3a is configured by externally fitting the front-side portion of the outer column 9a onto the rear-side portion of the inner column 8a so that relative displacement is possible in the axial direction. A steering shaft 2a is rotatably supported on the inner side of the steering column 3a via a plurality of rolling bearings, which are not illustrated. A steering wheel 38 is fixed to the rear-end portion of the steering shaft 2a, which protrudes rearward from a rear-end opening of the steering column 3a. Note that the front-rear direction, the width direction (left-right direction), and the vertical direction refer to the front-rear direction, the width direction (left-right direction), and the vertical direction of a vehicle in a state where the steering device is assembled in the vehicle, unless specified otherwise.

Figure 23:
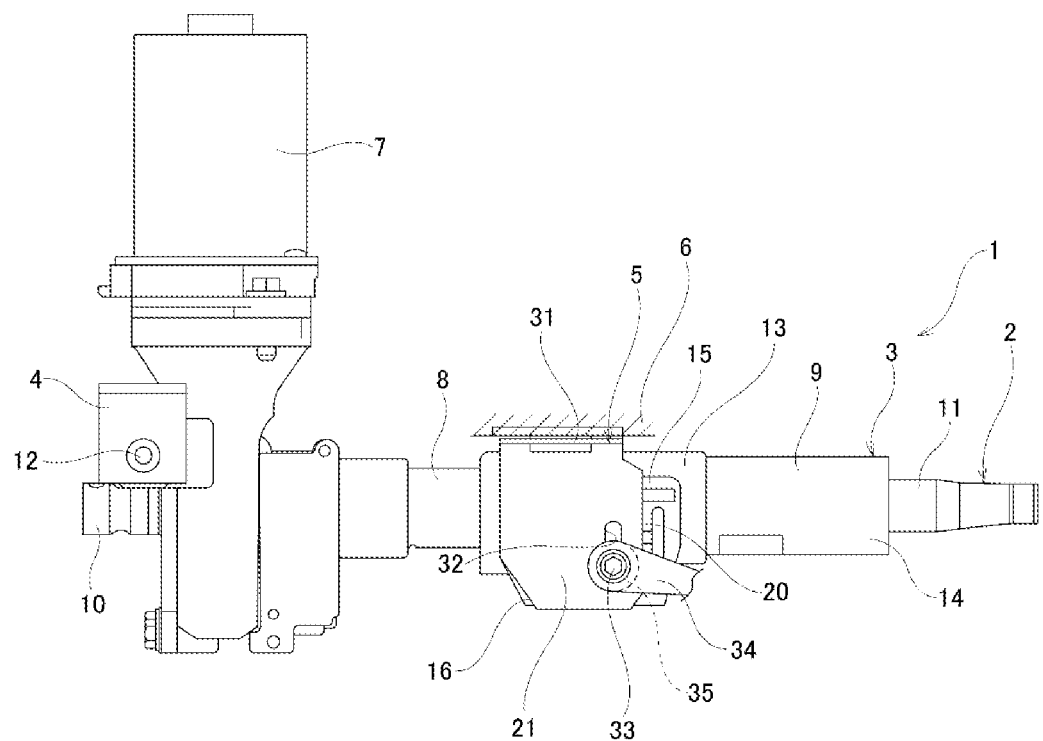
FIG. 23 is a side view illustrating a steering device with a conventional structure.
Figure 24:
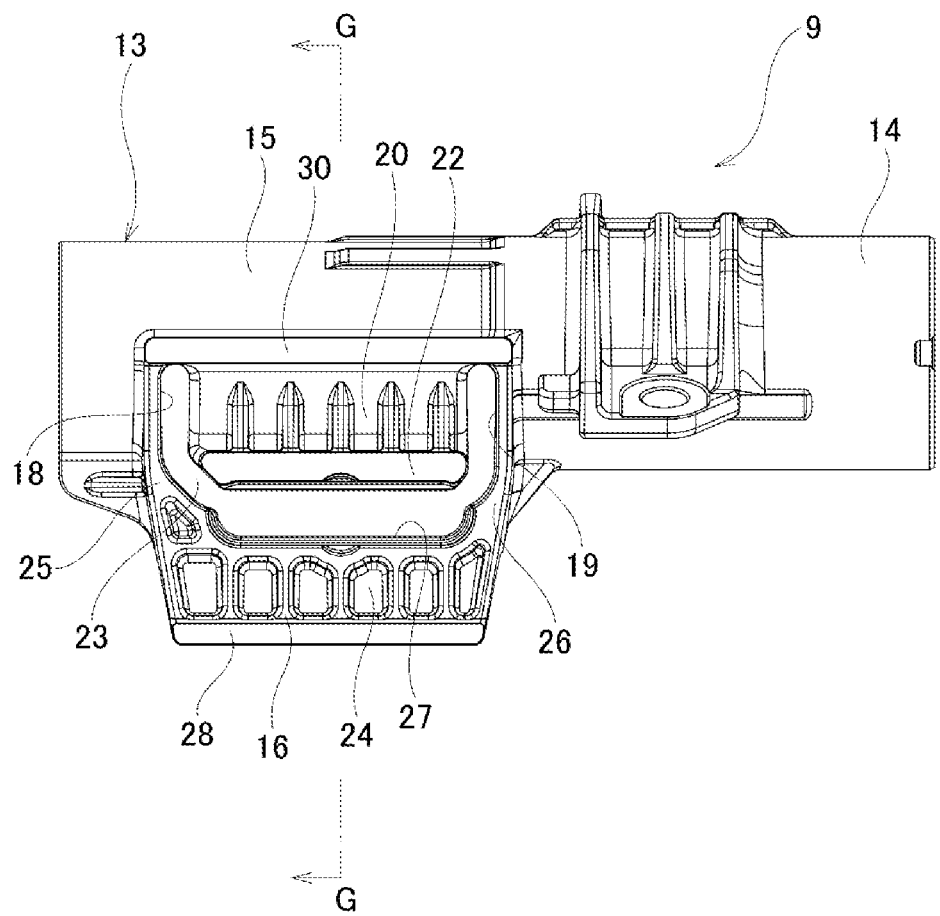
FIG. 24 is a side view of the outer column of the steering device with a conventional structure.
Figure 25:
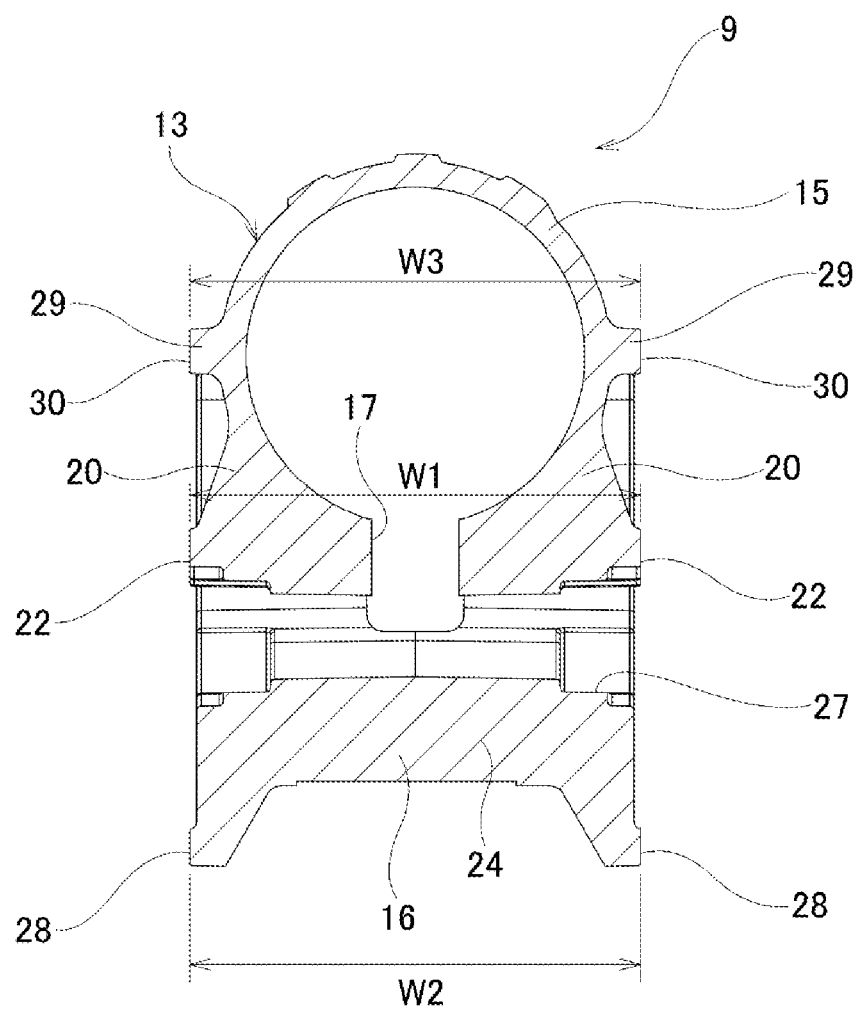
FIG. 25 is a cross-sectional view taken along line G-G of FIG. 24.

A gear housing 39 of an electric assist device 7a is arranged in the front-end portion of the steering column 3a. The gear housing 39 is supported by a lower bracket 4a, which is to be fixed to a vehicle body 6 (see FIG. 23), so as to be able to pivotally displace around a tilt shaft 12a that is arranged in the width direction. Due to this, the steering column 3a is able to pivotally displace around the tilt shaft 12a. An electric motor, which is not illustrated, is supported on the gear housing 39, and the output torque of the electric motor is applied to the steering shaft 2a by way of a reduction mechanism arranged inside the gear housing 39. As a result, a force required to operate the steering wheel 38 can be reduced.

The steering device 1a includes a tilt mechanism for adjusting the vertical position of the steering wheel 38, and a telescopic mechanism for adjusting the front-rear position of the steering wheel 38, according to the physique or posture of the driver.

In order to constitute the telescopic mechanism, the steering column 3a is configured so as to be able to extend or contract the entire length due to the relative displacement in the axial direction between the outer column 9a and the inner column 8a, and the outer column 9a is supported so as to be able to move in the front-rear direction with respect to the support bracket 5b. The steering shaft 2a is configured by combining an inner shaft 10a and an outer shaft 11a with a spline engagement or the like so as to be able to transmit torque and to be able to extend or contract.

In order to constitute the tilt mechanism, the steering column 3a is to be supported by the vehicle body 6 so as to be able to pivotally displace around the tilt shaft 12a, and the outer column 9a is supported so as to be able to move in the vertical direction with respect to the support bracket 5b.

The outer column 9a includes a pair of clamped portions 20a, which are arranged on both sides in the width direction of the inner column 8a and are able to sandwich the inner column 8a from both sides in the width direction due to elastic deformation in the width direction, and first tightened surfaces 22a, second tightened surfaces 28a and third tightened surfaces 30a, which are able to receive a tightening force from the inside surfaces in the width direction of a pair of support plate portions 21b of the upper bracket 5b. More specifically, as illustrated in FIG. 7 to FIG. 10, the outer column 9a includes a sandwiched portion 13a, which is made of a light alloy such as aluminum alloy and magnesium alloy and is arranged in the front half portion, and a cylindrical portion 14a, which is made of ferrous alloy such as carbon steel and is arranged in the rear half portion, and connected to the sandwiched portion 13a by casting in the axial direction. The sandwiched portion 13a is supported by the upper bracket 5b so as to be able to move in the front-rear direction and the vertical direction. A substantially cylindrical column body portion 15a, which is externally fitted onto the inner column 8a, is provided in the upper-side portion of the sandwiched portion 13a, and a substantially box-shaped reinforcing bridge portion 16a is provided in the lower-side portion of the sandwiched portion 13a, so that the reinforcing bridge portion 16a is integrally formed with the column body portion 15a. The sandwiched portion may be integrally formed with the cylindrical portion.

The column body portion 15a has a thin-walled portion 40 on the entire circumference of the intermediate portion in the front-rear direction, which has a smaller outer-diameter dimension compared to portions adjacent to both sides in the front-rear direction thereof. The column body portion 15a has thick-walled portions 41a, 41b on the entire circumference of portions thereof on both sides in the front-rear direction of the thin-walled portion 40, which have a larger outer-diameter dimension than the thin-walled portion 40. The thin-walled portion 40 and the thick-walled portions 41a, 41b have the same inner-diameter dimension as each other. The thin-walled portion 40 and the thick-walled portions 41a, 41b have the same dimension in the front-rear direction as each other. An upper-side rib 42 extending in the front-rear direction is provided on the central portion in the width direction of the upper surface of the thin-walled portion 40 of the column body portion 15a so as to connect thick-walled portions 41a, 41b, which are separated in the front-rear direction, to each other.

Figure 8:
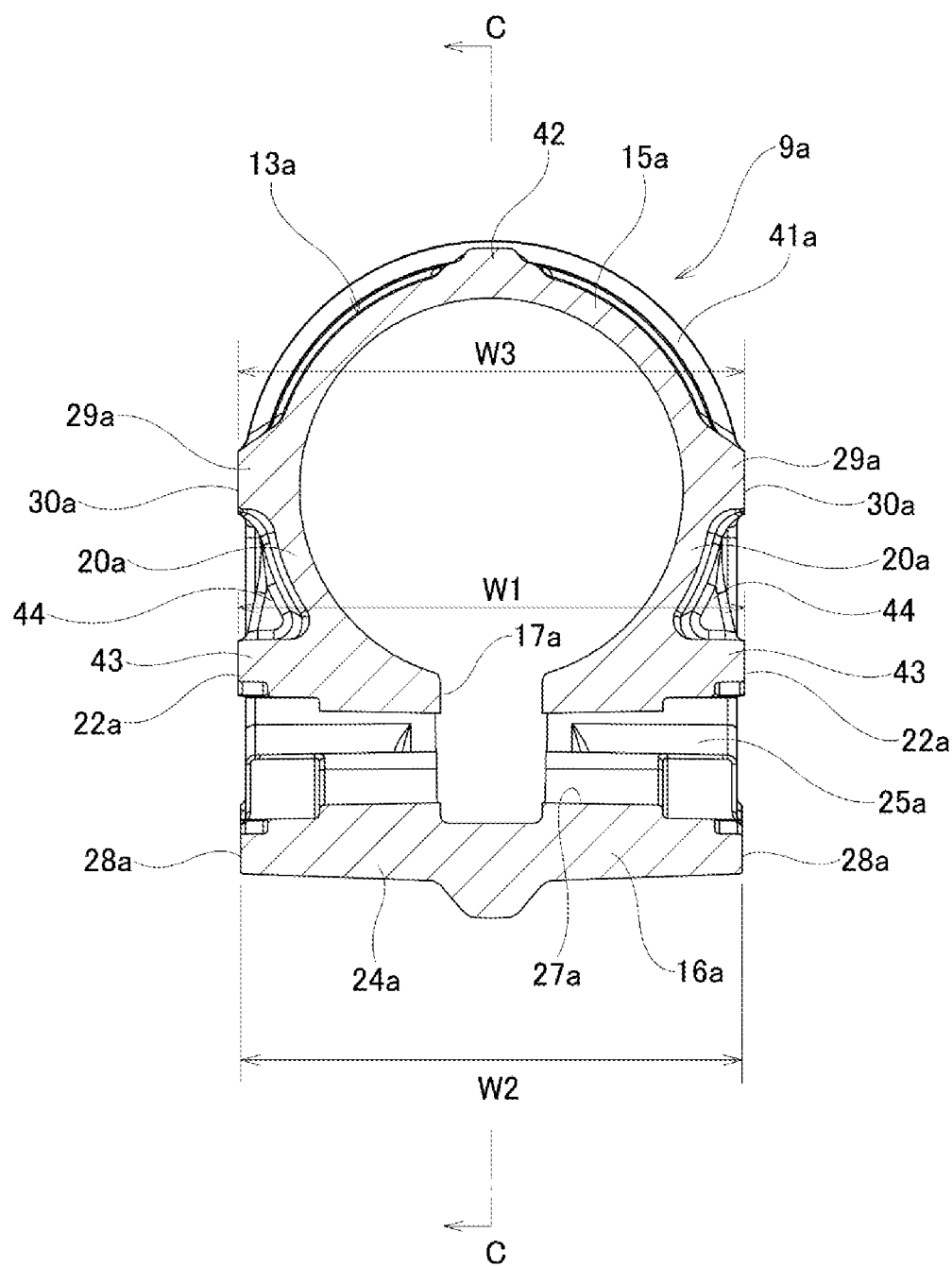
FIG. 8 is a cross-sectional view taken along line B-B of FIG. 7.
Figure 9:
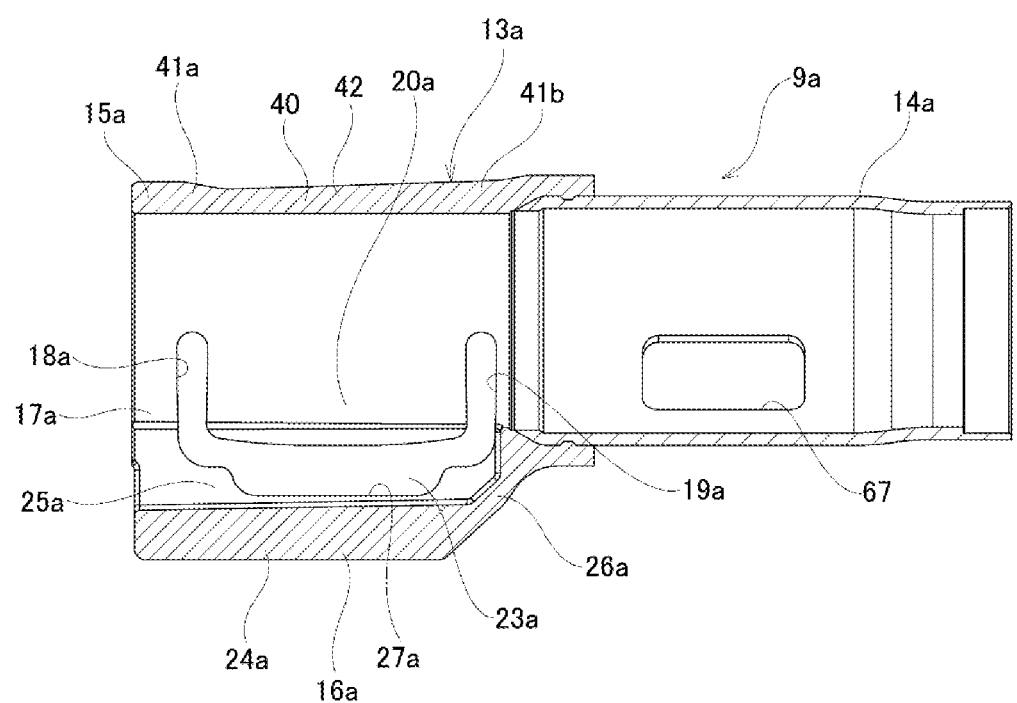
FIG. 9 is a cross-sectional view taken along line C-C of FIG. 8.
Figure 10:
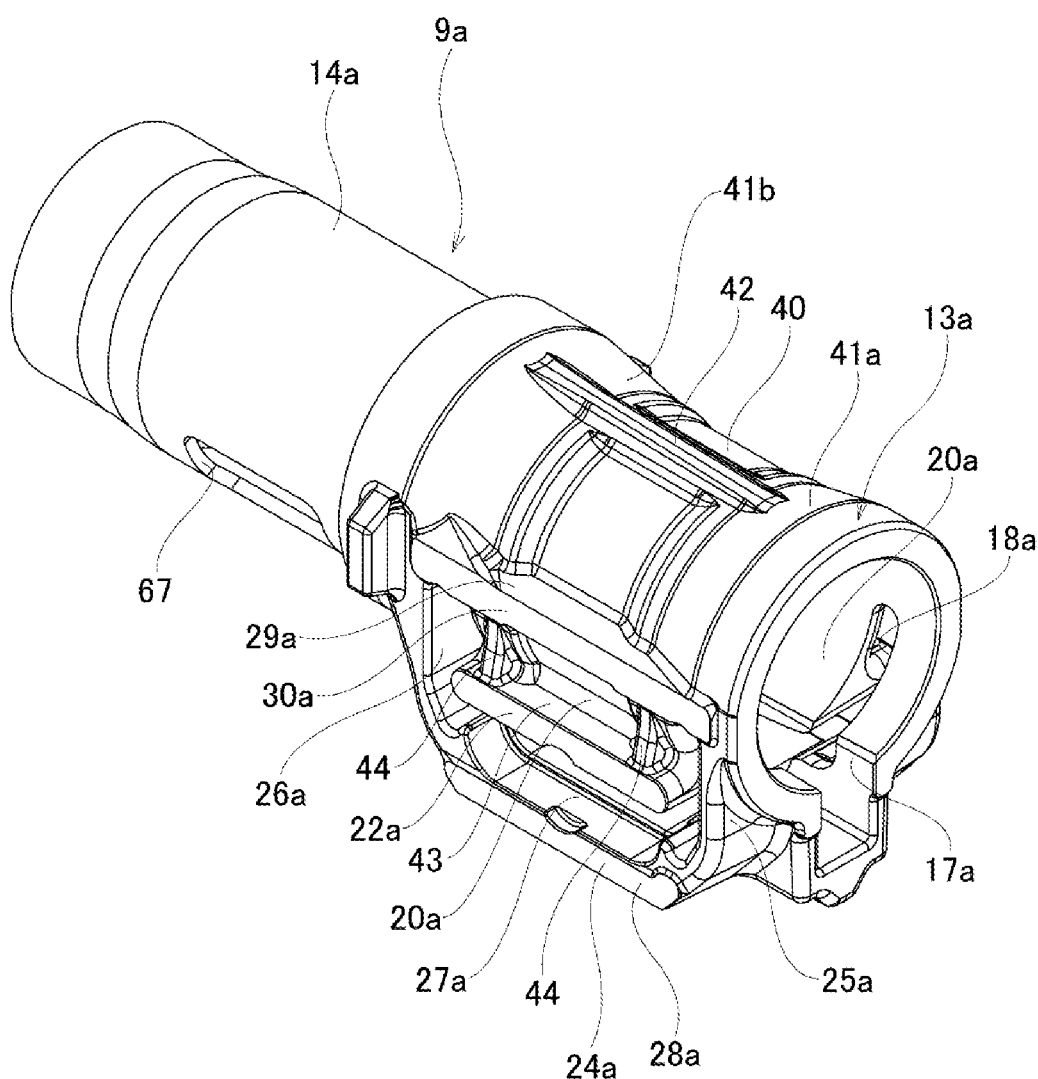
FIG. 10 is a perspective view of the outer column of the first example as viewed from the upper front side.
Figure 11:
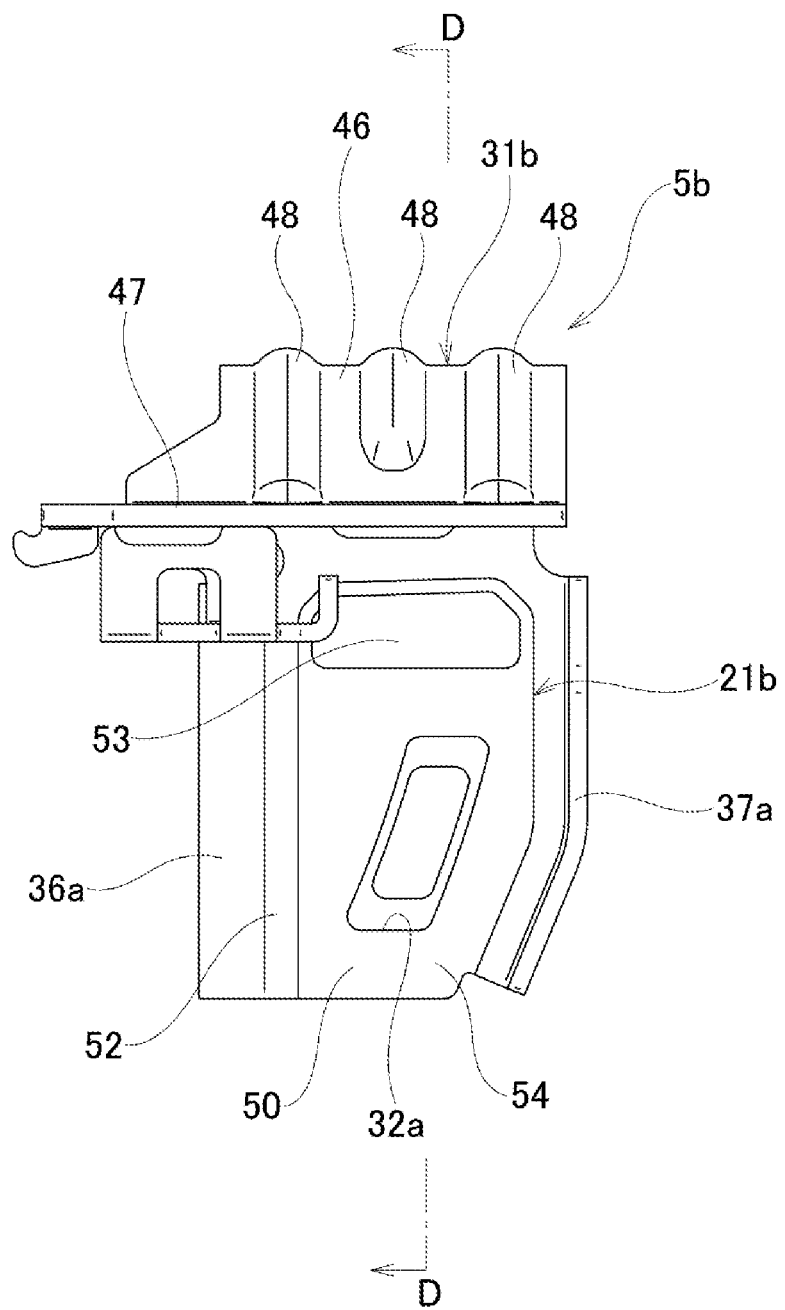
FIG. 11 is a side view of the upper bracket of the first example.
Figure 12:
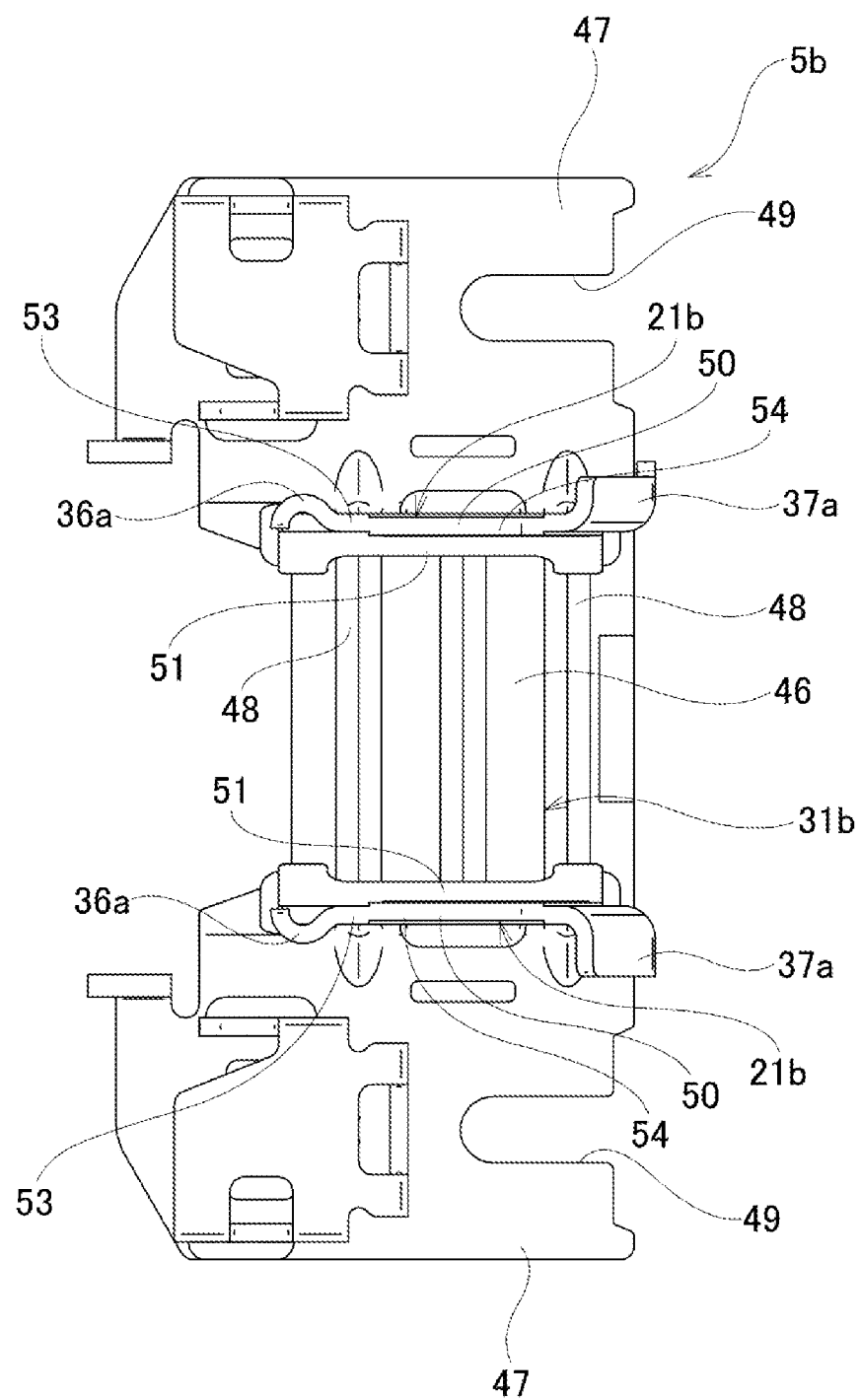
FIG. 12 is a bottom view of the upper bracket of the first example.
Figure 13:
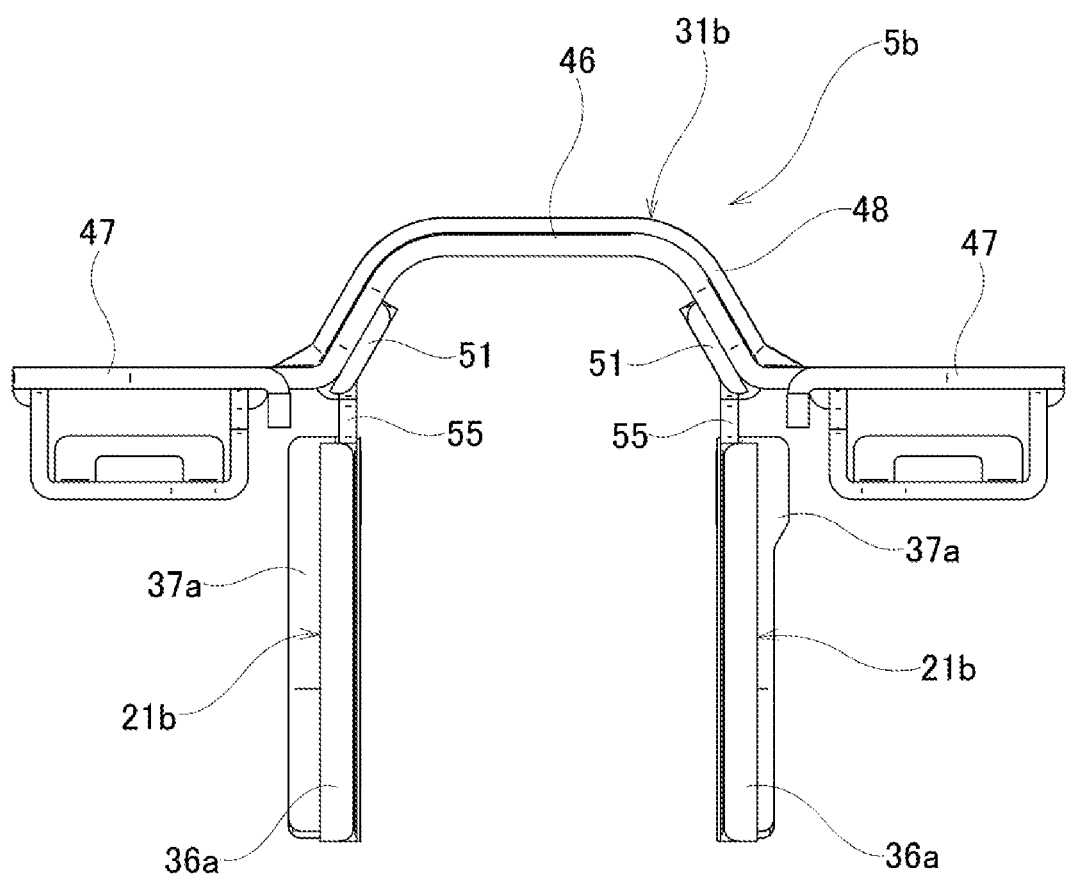
FIG. 13 is a view of the upper bracket of the first example as viewed from the front side.
Figure 14:
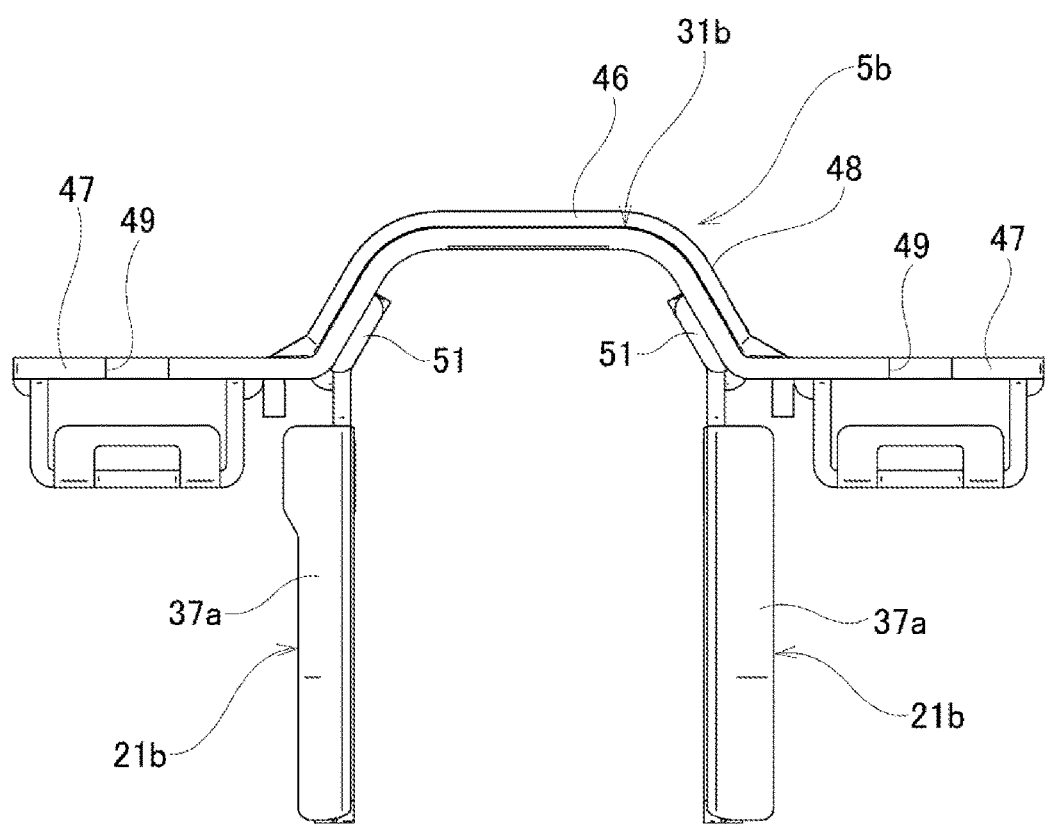
FIG. 14 is a view of the upper bracket of the first example as viewed from the rear side.
Figure 15:
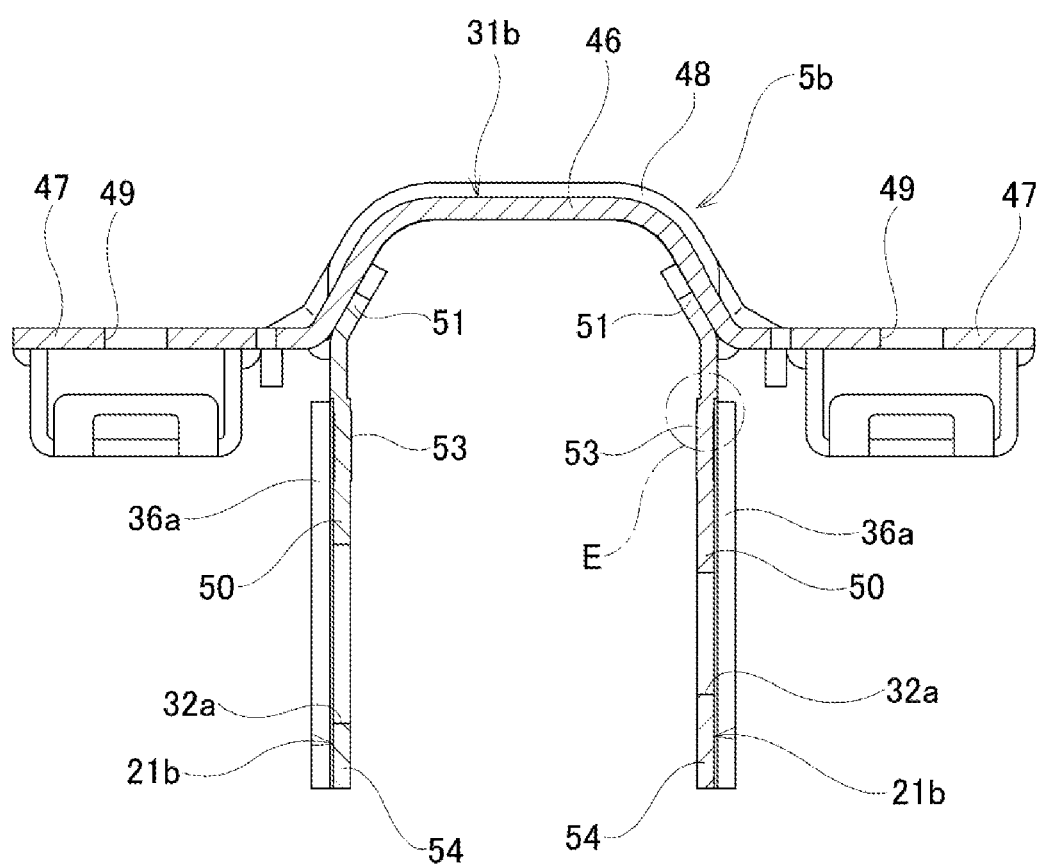
FIG. 15 is a cross-sectional view taken along line D-D of FIG. 11.

As illustrated in FIG. 8 and FIG. 9, a front-rear direction slit 17a extending in the front-rear direction is provided on the central portion in the width direction of the lower surface of the column body portion 15a. The front-rear direction slit 17a is open to the front-end surface of the column body portion 15a, and is not open to the rear-end surface of the column body portion 15a. The rear-end portion of the front-rear direction slit 17a is located on the rear-side section of the column body portion 15a. A front-side circumferential-direction slit 18a and a rear-side circumferential-direction slit 19a that extend in the circumferential direction are respectively provided on the front-side section and the rear-side section of the lower half portion of the column body portion 15a. As illustrated in FIG. 9, the front-side circumferential-direction slit 18a is formed so as to cross the front-side section of the front-rear direction slit 17a in the circumferential direction, and the rear-side circumferential-direction slit 19a is formed so as to cross the rear-end section of the front-rear direction slit 17a in the circumferential direction. The front-side circumferential-direction slit 18a is located on the intermediate portion in the front-rear direction of the thick-walled portion 41a arranged on the front side, and the rear-side circumferential-direction slit 19a is located on the intermediate portion in the front-rear direction of the thick-walled portion 41b arranged on the rear side. Both end portions in the circumferential direction of the front-side circumferential-direction slit 18a and both end portions in the circumferential direction of the rear-side circumferential-direction slit 19a are located in portions that substantially overlap the central axis of the outer column 9a with respect to the vertical direction.

The pair of clamped portions 20a is provided on portions on both sides in the width direction of the column body portion 15a that are surrounded on three sides, the inner side in the width direction, the front side, and the rear side, by the front-rear direction slit 17a, the front-side circumferential-direction slit 18a and the rear-side circumferential-direction slit 19a. A long hole for telescopic adjustment 27a extending in the front-rear direction exists below the pair of clamped portions 20a. Due to this, the pair of clamped portions 20a has a cantilever structure in which both end portions in the front-rear direction and the lower end portions each have a free end, and only the upper-end portions are connected to the column body portion 15a. Therefore, the pair of clamped portions 20a has lower rigidity with respect to the width direction compared to other portions of the sandwiched portion 13a so that elastic deformation in the width direction is possible. In other words, the inner diameter of the pair of clamped portions 20a is able to be elastically expanded or contracted.

Figure 7:
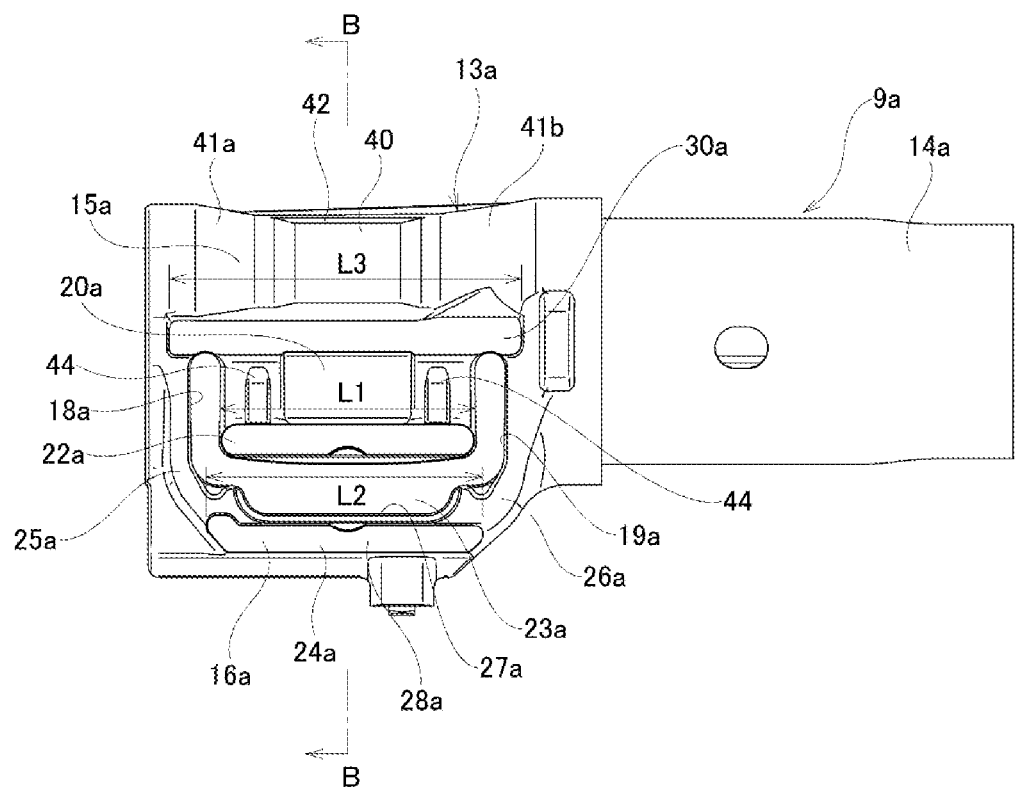
FIG. 7 is a side view of the outer column of the first example.

The pair of clamped portions 20a has an inner-circumferential surface with a partial cylindrical surface shape. As illustrated in FIG. 7, the front-side section of the pair of clamped portions 20a is configured by the rear-side section of the thick-walled portion 41a, the intermediate portion in the front-rear direction thereof is configured by the thin-walled portion 40, and the rear-side section thereof is configured by the front-side section of the thick-walled portion 41b. The pair of clamped portions 20a has projecting plate portions 43, which have a flat plate shape and protrude outward in the width direction, on the lower end portions of the outside surfaces in the width direction (outer-circumferential surfaces). The projecting plate portions 43 are arranged in the pair of clamped portions 20a over the entire length in the front-rear direction. The first tightened surface 22a are configured by the tip-end surfaces (outside surfaces in the width direction), which have a flat surface shape, of the projecting plate portions 43.

Horizontal-side rib 44 respectively having a flat plate shape is provided between the upper surfaces of the projecting plate portions 43 and the outside surfaces in the width direction of the pair of clamped portions 20a, which connects the upper surfaces of the projecting plate portions 43 and the outside surfaces in the width direction of the pair of clamped portions 20a. In the illustrated example, a plurality of (two in the illustrated example) horizontal-side ribs 44 are arranged on each side in the width direction, separated in the front-rear direction.

The reinforcing bridge portion 16a has a function to improve the torsional rigidity of the outer column 9a, and is arranged so as to cover the pair of clamped portions 20a via a substantially U-shaped gap 23a when viewed from the width direction. The reinforcing bridge portion 16a includes a bottom plate portion 24a, a front-side connecting portion 25a, and a rear-side connecting portion 26a, and has a substantially inverted mountain shape, in other words, a substantially trapezoidal shape without an upper side, when viewed from the width direction.

The bottom plate portion 24a has a substantially flat plate shape and is arranged below the pair of clamped portions 20a so as to be substantially parallel to the center axis of the outer column 9a, extending in the front-rear direction and the width direction. The long hole for telescopic adjustment 27a is configured by the lower side of the substantially U-shaped gap 23a, which exists between the bottom plate portion 24a and the lower end portions (projecting plate portions 43) of the pair of clamped portions 20a. The front-end portion of the long hole for telescopic adjustment 27a is open to the lower end portion of the front-side circumferential-direction slit 18a, and the rear-end portion of the long hole for telescopic adjustment 27a is open to the lower end portion of the rear-side circumferential-direction slit 19a. The front-end portion of the bottom plate portion 24a is located on a slightly more rear side than the front-side circumferential-direction slit 18a, and the rear-end portion of the bottom plate portion 24a is located on a slightly more front side than the rear-side circumferential-direction slit 19a. The second tightened surfaces (seat surfaces) 28a are configured by both-side surfaces in the width direction of the bottom plate portion 24a, which have a flat surface shape and receive a tightening force from the inside surfaces in the width direction of the support plate portions 21b. The second tightened surfaces 28a are located below the first tightened surfaces 22a. The bottom plate portion 24a, on which the second tightened surfaces 28a are arranged, corresponds to a portion with higher rigidity with respect to the width direction compared to the projecting plate portions 43 of the pair of clamped portions 20a, on which the first tightened surfaces 22a are arranged.

The front-side connecting portion 25a has a slightly smaller width dimension than the bottom plate portion 24a, and connects both-side portions in the width direction of the front-end portion of the bottom plate portion 24a to a portion of the lower surface of the column body portion 15a adjacent to the front side of the front-side circumferential-direction slit 18a.

The rear-side connecting portion 26a has a slightly smaller width dimension than the bottom plate portion 24a, and connects the rear-end portion of the bottom plate portion 24a to a portion of the lower surface of the column body portion 15a adjacent to the rear side of the rear-side circumferential-direction slit 19a.

Protruding portions 29a are provided on portions of both-side surfaces in the width direction of the column body portion 15a that overlap the central axis of the outer column 9a with respect to the vertical direction, which protrude outward in the width direction and extend in the front-rear direction. The third tightened surfaces 30a are configured by tip-end surfaces (outside surfaces in the width direction) of the protruding portion 29a, which have a flat surface shape and receive a tightening force from the inside surfaces in the width direction of the support plate portions 21b. The protruding portions 29a of the column body portion 15a, on which the third tightened surfaces 30a are arranged, correspond to portions with higher rigidity with respect to the width direction compared to the projecting plate portions 43 of the pair of clamped portions 20a, on which the first tightened surfaces 22a are arranged.

As illustrated in FIG. 8, in a state where a pressing force is not applied from the pair of support plate portions 21b to the sandwiched portion 13a of the outer column 9a, an interval W1 in the width direction between the first tightened surfaces 22a, an interval W2 in the width direction between the second tightened surfaces 28a and an interval W3 in the width direction between the third tightened surfaces 30a satisfy a relation of W1=W3>W2. In other words, a width dimension between the first tightened surfaces 22a and a width dimension between the third tightened surfaces 30a are equal to each other, and are larger than a width dimension between the second tightened surfaces 28a. Due to this, the first tightened surface 22a and the third tightened surface 30a on one side in the width direction are located on the same virtual plane, and the first tightened surface 22a and the third tightened surface 30a on the other side in the width direction are also located on the same virtual plane. On each side in the width direction, the second tightened surface 28a is located further inward in the width direction than the first tightened surface 22a and the third tightened surface 30a.

As illustrated in FIG. 7, a dimension L1 in the front-rear direction of the first tightened surface 22a, a dimension L2 in the front-rear direction of the second tightened surface 28a, and a dimension L3 in the front-rear direction of the third tightened surface 30a satisfy a relation of L1<L2<L3. In the illustrated example, the first tightened surface 22a is located in the center part in the vertical direction between the second tightened surface 28a and the third tightened surface 30a. However, the first tightened surface 22a may be arranged to be offset toward the side on which the second tightened surface 28a is arranged (lower side) or the side on which the third tightened surface 30a is arranged (upper side).

In the illustrated example, the central portion in the front-rear direction of the first tightened surface 22a, the central portion in the front-rear direction of the second tightened surface 28a, and the central portion in the front-rear direction of the third tightened surface 30a are located at the same position in the front-rear direction as each other. However, the central portion in the front-rear direction of the first tightened surface 22a may be offset toward the front side or the rear side with respect to the central portion in the front-rear direction of the second tightened surface 28a and the central portion in the front-rear direction of the third tightened surface 30a.

The upper bracket 5b has a function to have the outer column 9a supported by the vehicle body 6. The upper bracket 5b is made of a metal plate having sufficient rigidity such as steel or aluminum alloy, and has a mounting plate portion 31b and a pair of support plate portions 21b. When the upper bracket 5b is made of steel, the thickness dimension (plate thickness) of the upper bracket 5b is about 2.0 mm to 4.0 mm. In this example, the thickness dimension of the upper bracket 5b is 2.6 mm.

The mounting plate portion 31b is normally supported by the vehicle body 6. In the event of a collision accident, the mounting plate portion 31b is released forward due to an impact of a secondary collision, which allows the outer column 9a to displace forward. Therefore, the mounting plate portion 31b is locked to the locking capsules 45, which are supported by and fixed to the vehicle body 6, so as to be able to be released forward.

The mounting plate portion 31b includes a bridge portion 46 that is arranged in the central portion in the width direction, and a pair of side plate portions 47 that is arranged on both sides in the width direction thereof. The bridge portion 46 has an inverted U-shaped cross-sectional shape, and is arranged above the sandwiched portion 13a of the outer column 9a. The bridge portion 46 includes a plurality of (three in the illustrated example) bracket ribs 48 that are arranged to be separated in the front-rear direction. Due to the bracket ribs 48, the bridge portion 46 has higher rigidity compared to the pair of side plate portions 47. Each of the pair of side plate portions 47 has a flat plate shape, and includes a locking notch 49 that is open at the edge on the rear end for locking the locking capsule 45.

The upper-end portions of the pair of support plate portions 21b are fixed to the lower surfaces of both-side portions in the width direction of the bridge portion 46, so that the pair of support plate portions 21b are arranged on both sides in the width direction of the sandwiched portion 13a of the outer column 9a so as to be substantially parallel to each other. Each of the pair of support plate portions 21b is composed of a plate-shaped member, and includes a support plate body 50 that is arranged in the intermediate portion in the front-rear direction, a front-side reinforcing portion 36a that is arranged in the front-end portion, a rear-side reinforcing portion 37a that is arranged in the rear-end portion, and a lug portion for welding 51 that is arranged in the upper-end portion.

The support plate body 50 has a stepped plate shape extending in the vertical direction and the front-rear direction. The support plate body 50 is formed by applying a press working such as a face press working, a punch working and the like to a portion of a flat-plate shaped material having a constant thickness. The support plate body 50 includes a base plate portion 52, a stepped portion 53 that has a concave shape on the outer side in the width direction, a convex shape on the inner side in the width direction, and an inside surface in the width direction, and that projects to the most inner side in the width direction, an auxiliary stepped portion 54 that has a concave shape on the outer side in the width direction and a convex shape on the inner side in the width direction, and that has a smaller amount of projection toward the inside in the width direction compared to the stepped portion 53, and a tilt adjusting long hole 32a that penetrates in the width direction.

The auxiliary stepped portion 54 has a vertically long rectangular shape in which the dimension in the vertical direction is larger than the dimension in the front-rear direction, and is provided in a large area of the support plate body 50. Specifically, the auxiliary stepped portion 54 is arranged in an area that extends from a portion near the upper end of the support plate body 50 to the lower end portion thereof, and that extends from a portion near the front end of the support plate body 50 to a portion near the rear end thereof. The base plate portion 52 exists in a section between the auxiliary stepped portion 54 and the front-side reinforcing portion 36a, a section between the auxiliary stepped portion 54 and the rear-side reinforcing portion 37a, and a section between the auxiliary stepped portion 54 and the lug portion for welding 51. In other words, the base plate portion 52 exists in a section that surrounds the three sides of the auxiliary stepped portion 54 except the lower side of the auxiliary stepped portion 54. The upper-end position of the auxiliary stepped portion 54 substantially coincides with the upper-end positions of the front-side reinforcing portion 36a and the rear-side reinforcing portion 37a.

Figure 16:
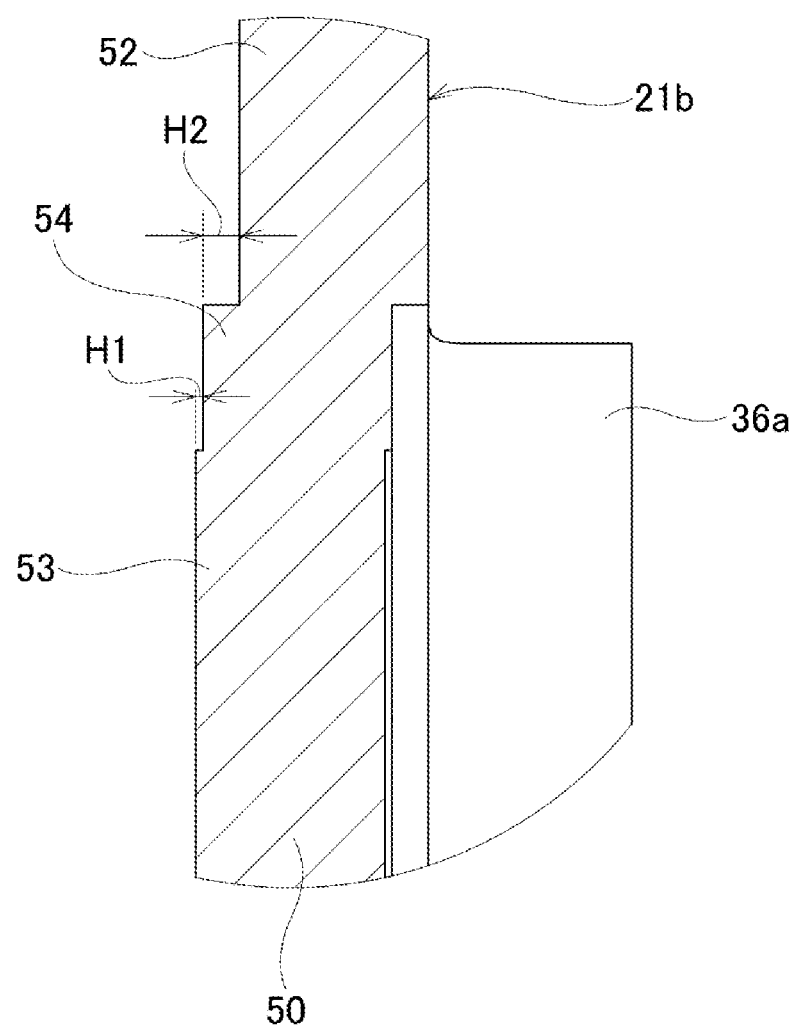
FIG. 16 is an enlarged view of a section E of FIG. 15.
Figure 17:
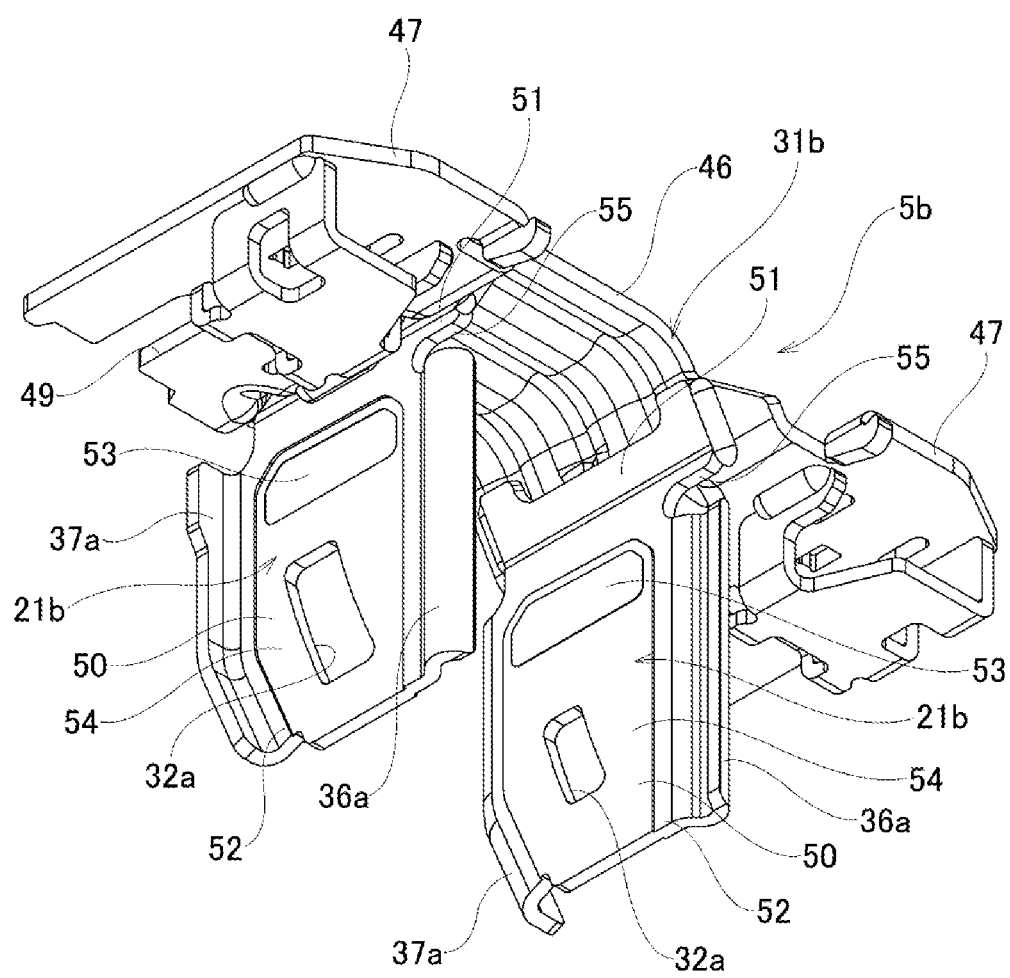
FIG. 17 is a perspective view of the upper bracket of the first example as viewed from the lower front side.
Figure 18:
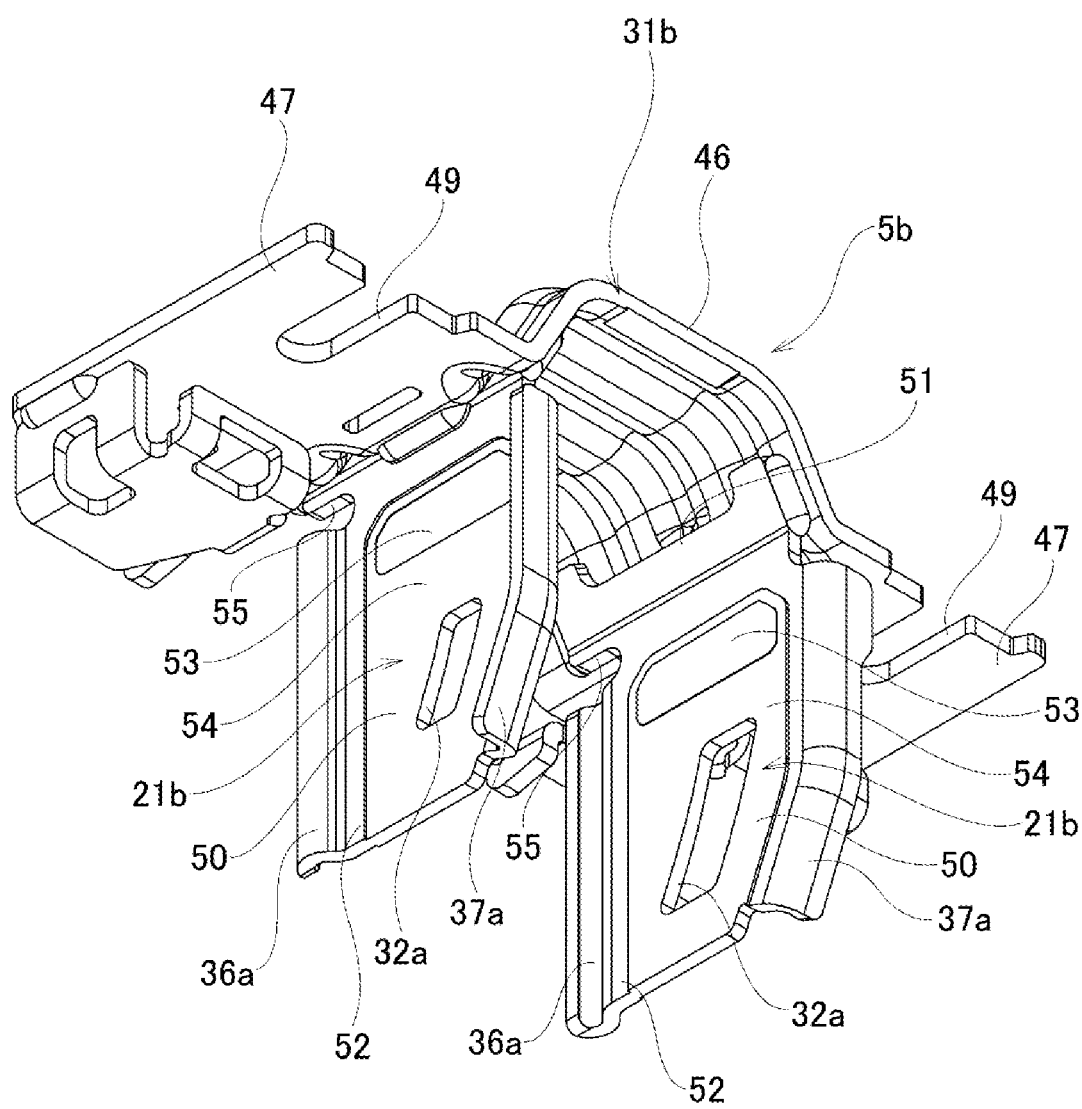
FIG. 18 is a perspective view of the upper bracket of the first example as viewed from the lower rear side.
Figure 19:
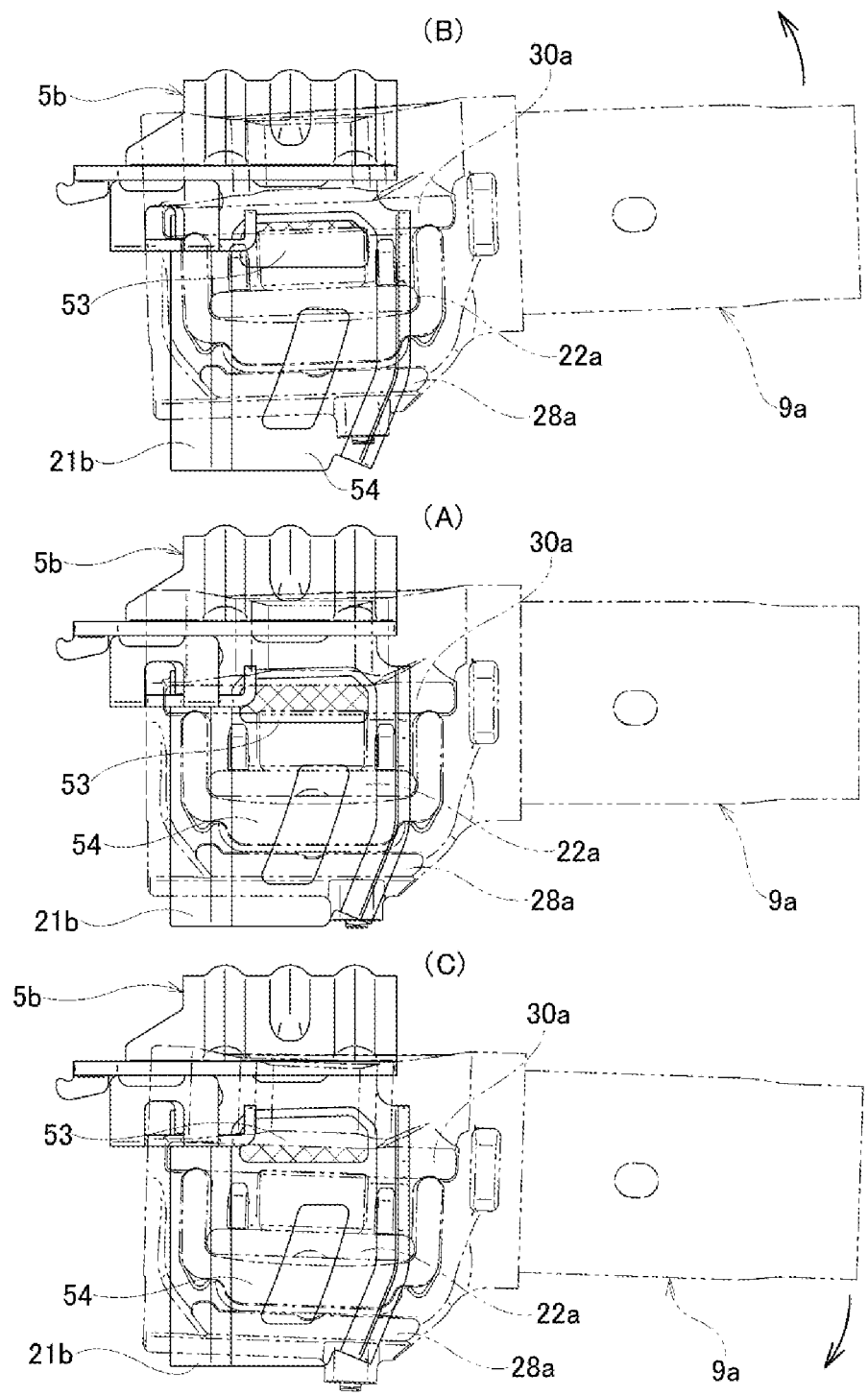
FIG. 19(A) to FIG. 19(C) are side views for describing a positional relation between the inside surface in the width direction of a stepped portion and a third tightened surface when the outer column is moved in the vertical direction with respect to the upper bracket.
Figure 20:
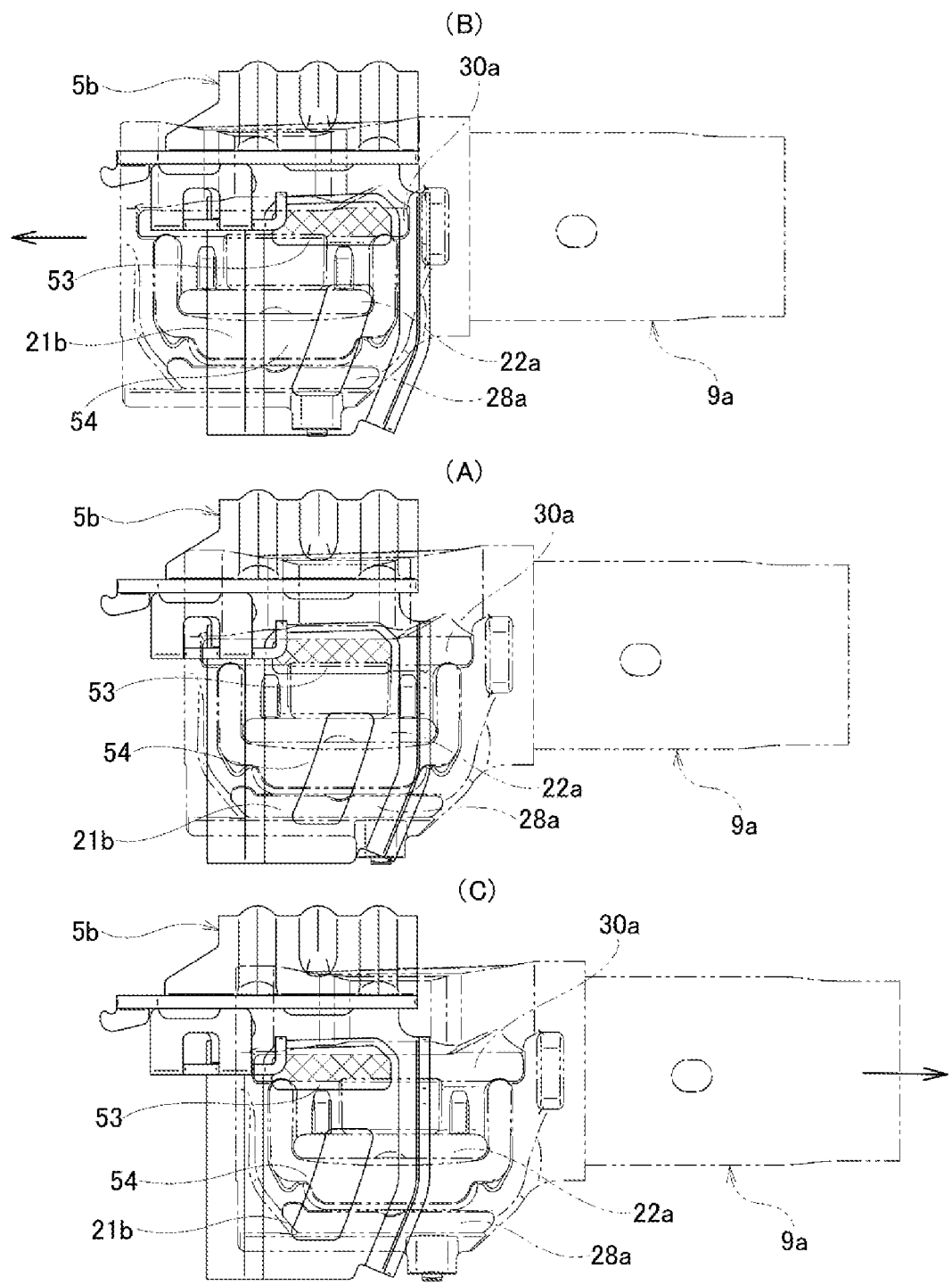
FIG. 20(A) to FIG. 20(C) are side views for describing a positional relation between the inside surface in the width direction of the stepped portion and the third tightened surface when the outer column is moved in the front-rear direction with respect to the upper bracket.
Figure 21:
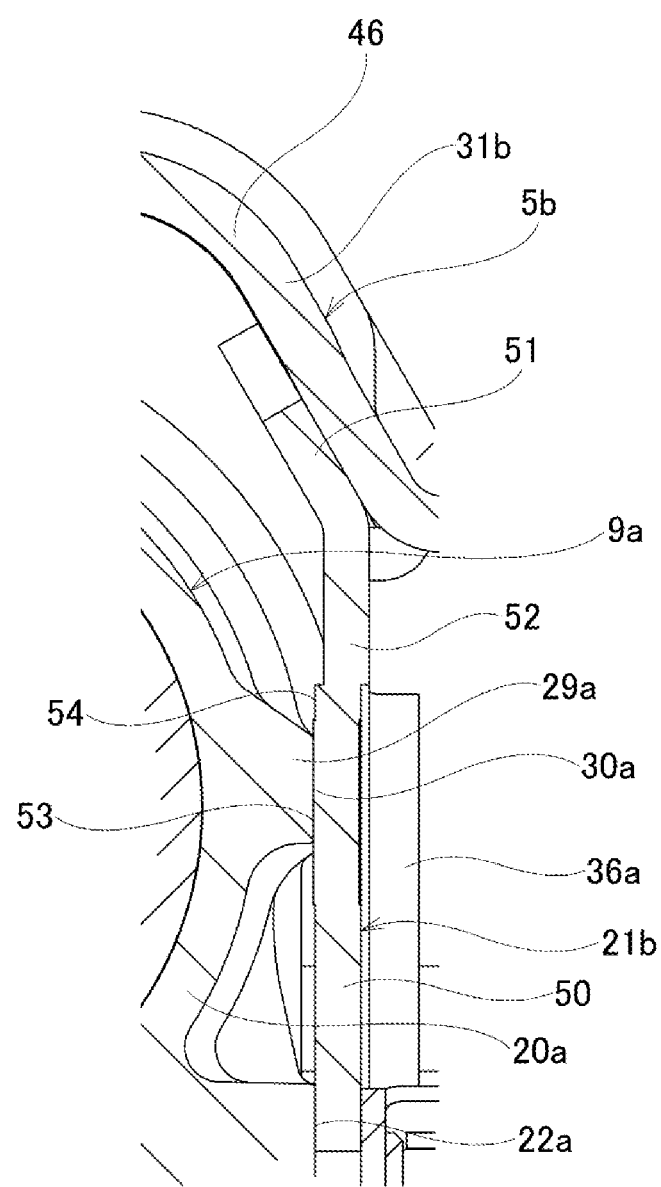
FIG. 21 is an enlarged view of a section F of FIG. 3.

The auxiliary stepped portion 54 is formed by applying a face press working to the base plate portion 52, and has a concave shape on the outer side in the width direction and a convex shape on the inner side in the width direction. The inside surface in the width direction of the auxiliary stepped portion 54, which has a flat surface shape, projects further inward in the width direction than the inside surface in the width direction of the base plate portion 52, and is arranged to be substantially parallel to the inside surface in the width direction of the base plate portion 52. The inside surface in the width direction of the auxiliary stepped portion 54 faces the first tightened surface 22a and the second tightened surface 28a in the width direction. The outside surface in the width direction of the auxiliary stepped portion 54, which has a flat surface shape, is recessed further inward in the width direction than the outside surface in the width direction of the base plate portion 52, and is arranged to be substantially parallel to the outside surface in the width direction of the base plate portion 52. As illustrated in FIG. 16, the height H2 (=depth) of the auxiliary stepped portion 54 with respect to the base plate portion 52 is about 0.2 mm to 0.8 mm. In this example, the height H2 of the auxiliary stepped portion 54 is 0.5 mm.

The tilt adjusting long hole 32a has a partial arc shape around the tilt shaft 12a, and extends in the vertical direction. The tilt adjusting long hole 32a is arranged in the intermediate portion in the vertical direction and the front-rear direction of the auxiliary stepped portion 54. The outside surface in the width direction of the auxiliary stepped portion 54 functions as a seat surface for a driven-side cam 62 of a cam device 35a or a pressing plate 60.

The stepped portion 53 has a horizontally long rectangular shape in which the dimension in the front-rear direction is larger than the dimension in the vertical direction, and is arranged in a portion of the auxiliary stepped portion 54, more specifically, in this example, in the upper-end portion of the auxiliary stepped portion 54 above the tilt adjusting long hole 32a. The stepped portion 53 is formed by applying a face press working to the auxiliary stepped portion 54, and has a concave shape on the outer side in the width direction and a convex shape on the inner side in the width direction. The inside surface in the width direction of the stepped portion 53, which has a flat surface shape, projects further inward in the width direction than the inside surface in the width direction of the auxiliary stepped portion 54, and is arranged to be substantially parallel to the inside surface in the width direction of the auxiliary stepped portion 54. The outside surface in the width direction of the stepped portion 53, which has a flat surface shape, is recessed further inward in the width direction than the outside surface in the width direction of the auxiliary stepped portion 54, and is arranged to be substantially parallel to the outside surface in the width direction of the auxiliary stepped portion 54.

As illustrated in FIG. 16, the height H1 (=depth) of the stepped portion 53 with respect to the auxiliary stepped portion 54 is about 0.05 mm to 0.2 mm. In this example, the height H1 of the stepped portion 53 is 0.1 mm. Therefore, the inside surface in the width direction of the stepped portion 53 projects toward the inside in the width direction from the inside surface in the width direction of the base plate portion 52 by the sum of the height H2 of the auxiliary stepped portion 54 and the height H1 of the stepped portion 53 (H1+H2, 0.6 mm in this example). In this example, the height H1 of the stepped portion 53 is smaller than the height H2 of the auxiliary stepped portion 54, but the height H1 of the stepped portion 53 may be larger than the height H2 of the auxiliary stepped portion 54, as well as these heights may be equal to each other. The upper-end position of the stepped portion 53 is located slightly below the upper-end positions of the front-side reinforcing portion 36a and the rear-side reinforcing portion 37a.

In this example, the range (shape and dimension) of the stepped portion 53 is regulated as follows. That is, the steering device 1a of this example is able to allow the outer column 9a to move in the vertical direction and the front-rear direction with respect to the support bracket 5b within a range where the adjustment rod 33a can move inside the long hole for telescopic adjustment 27a and the tilt adjusting long holes 32a. As a result, the range of the stepped portion 53 is regulated so that regardless of the support position of the outer column 9a with respect to the upper bracket 5b, which changes in both the vertical direction and the front-rear direction, the inside surface in the width direction of the stepped portion 53 does not face the first tightened surface 22a and the second tightened surface 28a in the width direction, and faces only the third tightened surface 30a in the width direction. In other words, the stepped portion 53 is arranged so that even when the outer column 9a is moved in the vertical direction and the front-rear direction with respect to the upper bracket 5b, the inside surface in the width direction of the stepped portion 53 always faces the third tightened surface 30a in the width direction. Especially, in this example, the range of the stepped portion 53 is regulated so that the inside surface in the width direction of the stepped portion 53 faces the third tightened surface 30a in the width direction over the entire length in the front-rear direction of the stepped portion 53.

In any cases where the outer column 9a exists in the neutral position as illustrated in FIG. 19(A), where the outer column 9a has been moved to the upper side with respect to the upper bracket 5b as illustrated in FIG. 19(B), and where the outer column 9a has been moved to the lower side with respect to the upper bracket 5b as illustrated in FIG. 19(C), the inside surface in the width direction of the stepped portion 53 faces the third tightened surface 30a within a range to which an oblique lattice pattern is applied. In the neutral position as illustrated in FIG. 19(A), a large range of the inside surface in the width direction of the stepped portion 53 except the upper-end portion and the lower end portion faces the third tightened surface 30a. In the state as illustrated in FIG. 19(B), the upper-side portion of the inside surface in the width direction of the stepped portion 53 faces the third tightened surface 30a. In the state as illustrated in FIG. 19(C), the lower-side portion of the inside surface in the width direction of the stepped portion 53 faces the third tightened surface 30a.

In any cases where the outer column 9a exists in the neutral position as illustrated in FIG. 20(A), where the outer column 9a has been moved to the front side with respect to the upper bracket 5b as illustrated in FIG. 20(B), and where the outer column 9a has been moved to the rear side with respect to the upper bracket 5b as illustrated in FIG. 20(C), the inside surface in the width direction of the stepped portion 53 faces the third tightened surface 30a within a range to which an oblique lattice pattern is applied.

The front-side reinforcing portion 36a that is arranged in the front-end portion of each of the pair of support plate portions 21b and the rear-side reinforcing portion 37a that is arranged in the rear-end portion of each of the pair of support plate portions 21b have a function to prevent the pair of support plate portions 21b from being plastically deformed, even when a torque (torsional torque) is applied from the outer column 9a to the pair of support plate portions 21b, such as when the steering wheel 38 is operated with a large force in a state where a steering lock device is activated. In other words, the front-side reinforcing portion 36a and the rear-side reinforcing portion 37a enhance the cross-sectional modulus of each of the pair of support plate portions 21b, so that the bending rigidity with respect to the width direction of the pair of support plate portions 21b is improved.

The front-side reinforcing portion 36a, which is located in the front-end portion of each of the pair of support plate portions 21b, linearly extends in the vertical direction. The rear-end portion of the front-side reinforcing portion 36a is connected to the front-end portion of the support plate body 50. The upper-end portion of the front-side reinforcing portion 36a is not connected to the bridge portion 46, and thus has a free end. Due to this, a slit 55 extending in the front-rear direction exists between the front-side reinforcing portion 36a and the lug portion for welding 51. The front-side reinforcing portion 36a is curved to project outward in the width direction, and thus has a semicircular-arc cross-sectional shape. Therefore, the front-end portion of the front-side reinforcing portion 36a faces the inside in the width direction. However, the front-end portion of the front-side reinforcing portion 36a is located further outward in the width direction than the inside surfaces in the width direction of the stepped portion 53 and the auxiliary stepped portion 54. Accordingly, the front-end portion of the front-side reinforcing portion 36 cannot be brought in contact with the first tightened surface 22a, the second tightened surface 28a, and the third tightened surface 30a of the outer column 9a.

The rear-side reinforcing portion 37a, which is located in the rear-end portion of each of the pair of support plate portions 21b, extends in the vertical direction. The rear-side reinforcing portion 37a is formed by bending the end portion of each of the support plate portions 21b outward in the width direction substantially at a right angle. The front-end portion of the rear-side reinforcing portion 37a is connected to the rear-end portion of the support plate body 50. The upper-end portion of the rear-side reinforcing portion 37a is not connected to the bridge portion 46, and thus has a free end. Therefore, the rear-side reinforcing portion 37a is arranged behind the lug portion for welding 51. The upper half portion of the rear-side reinforcing portion 37a is arranged to be substantially parallel to the front-side reinforcing portion 36a, and linearly extends in the vertical direction. On the other hand, the lower half portion of the rear-side reinforcing portion 37a is inclined in a further forward direction as going toward the lower side.

The lug portion for welding 51 is arranged in the upper-end portion of each of the pair of support plate portions 21b, and is inclined in a further inward direction in the width direction as going toward the upper side. The lug portion for welding 51 is fixed to the bridge portion 46 by welding in a state where the outside surface in the width direction of the lug portion for welding 51 is in surface contact with the lower surface of the outside portion in the width direction of the bridge portion 46. The lower end portion of the lug portion for welding 51 is connected to the upper-end portion of the support plate body 50. The lower end portion of the lug portion for welding 51 is not connected to the upper-end portion of the front-side reinforcing portion 36a and the upper-end portion of the rear-side reinforcing portion 37a.

Figure 1:
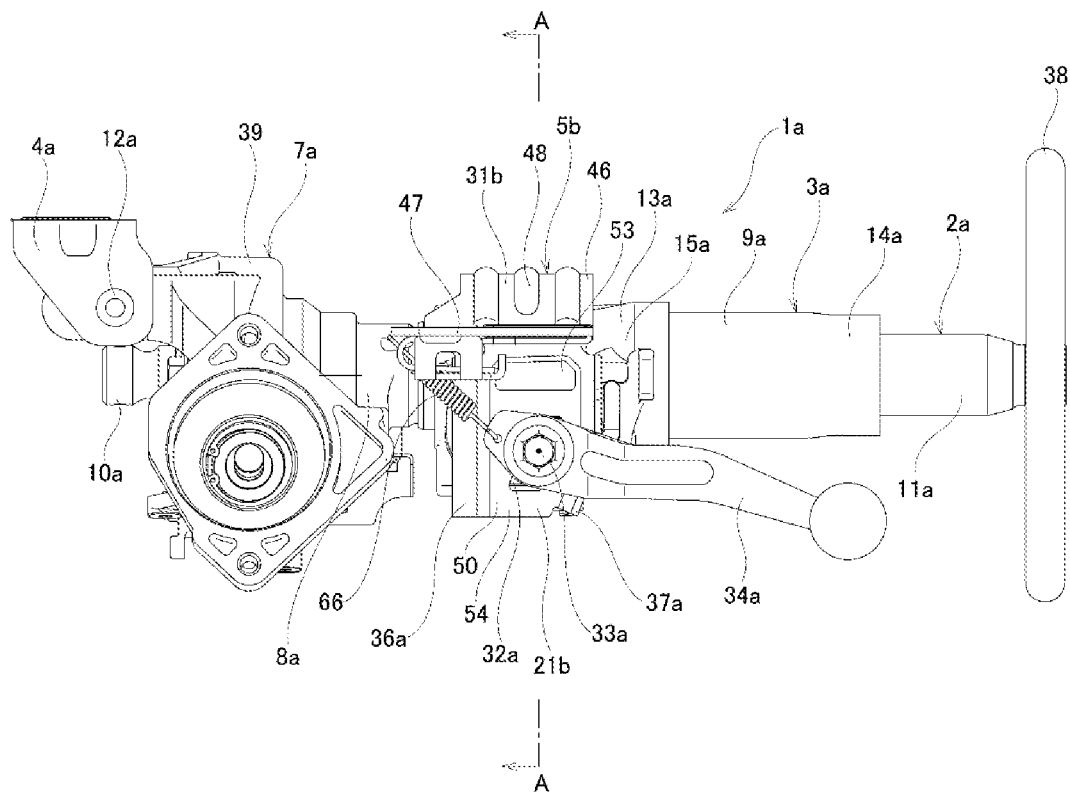
FIG. 1 is a side view illustrating a steering device of a first example of an embodiment of the present invention.
Figure 2:
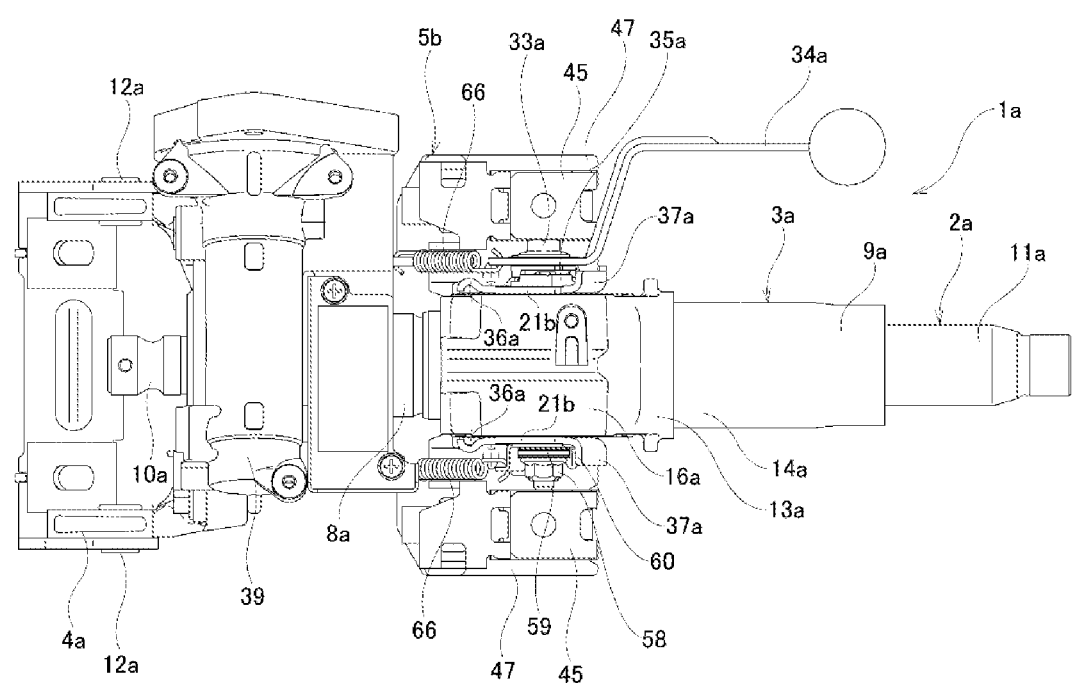
FIG. 2 is a bottom view illustrating the steering device of the first example.
Figure 3:
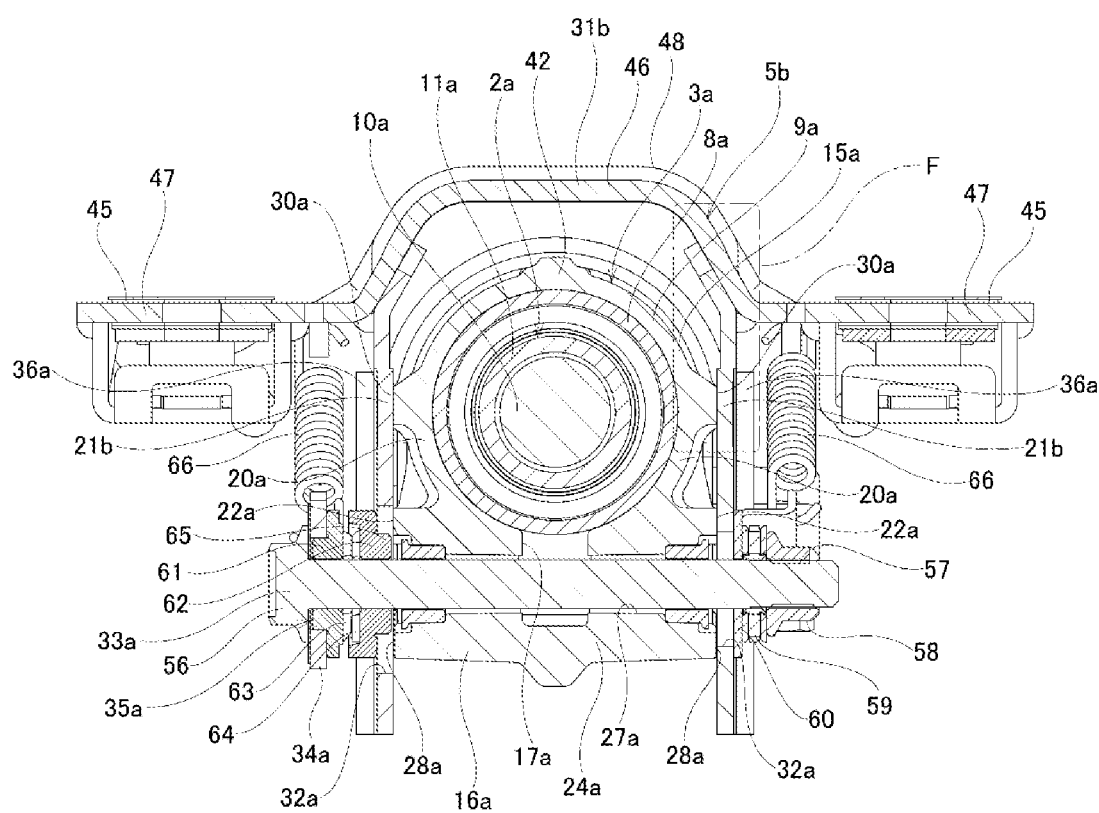
FIG. 3 is a cross-sectional view taken along line A-A of FIG. 1.
Figure 4:
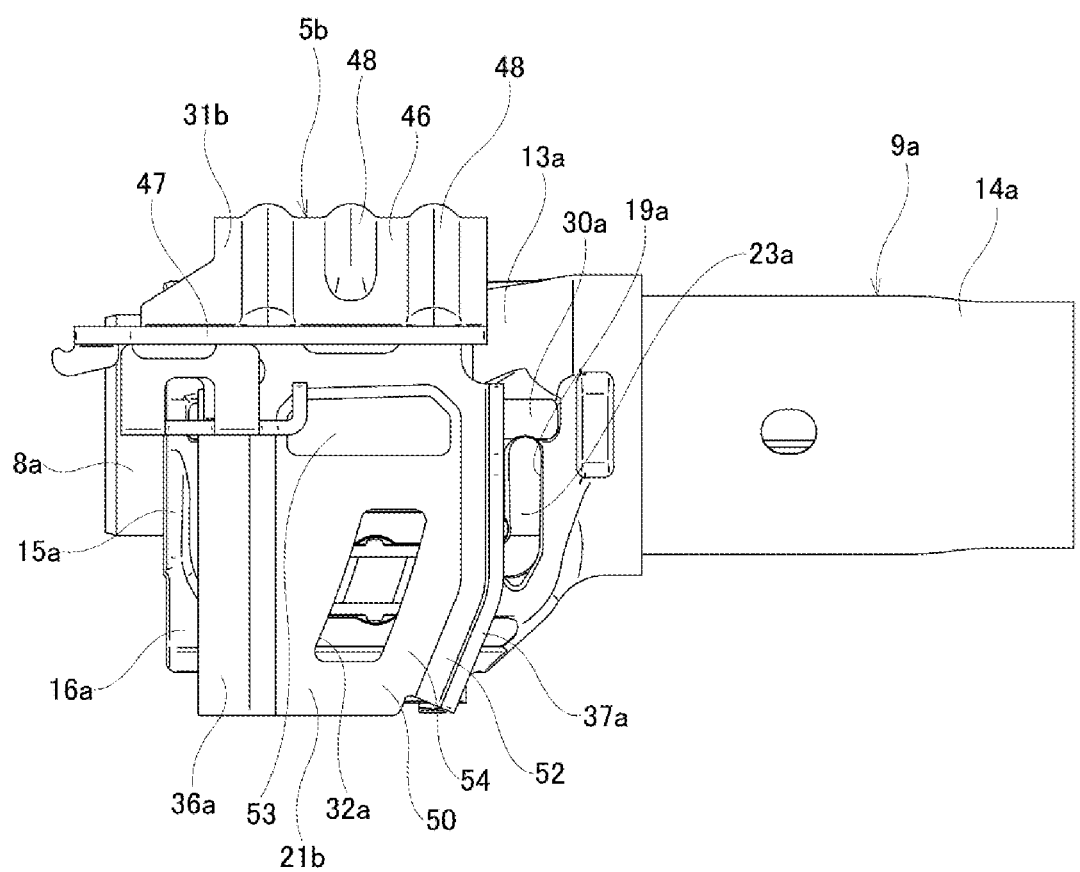
FIG. 4 is a side view of an inner column, an outer column and an upper bracket of the steering device of the first example.
Figure 5:
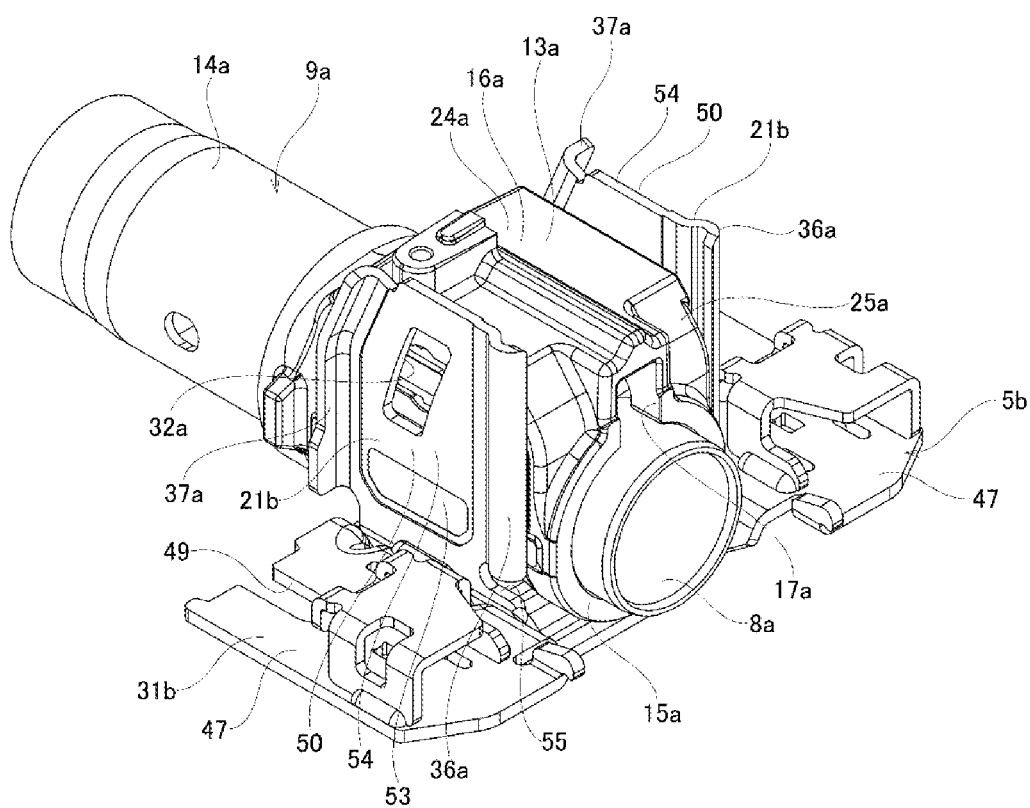
FIG. 5 is a perspective view of the inner column, the outer column and the upper bracket of the first example as viewed from the lower front side.
Figure 6:
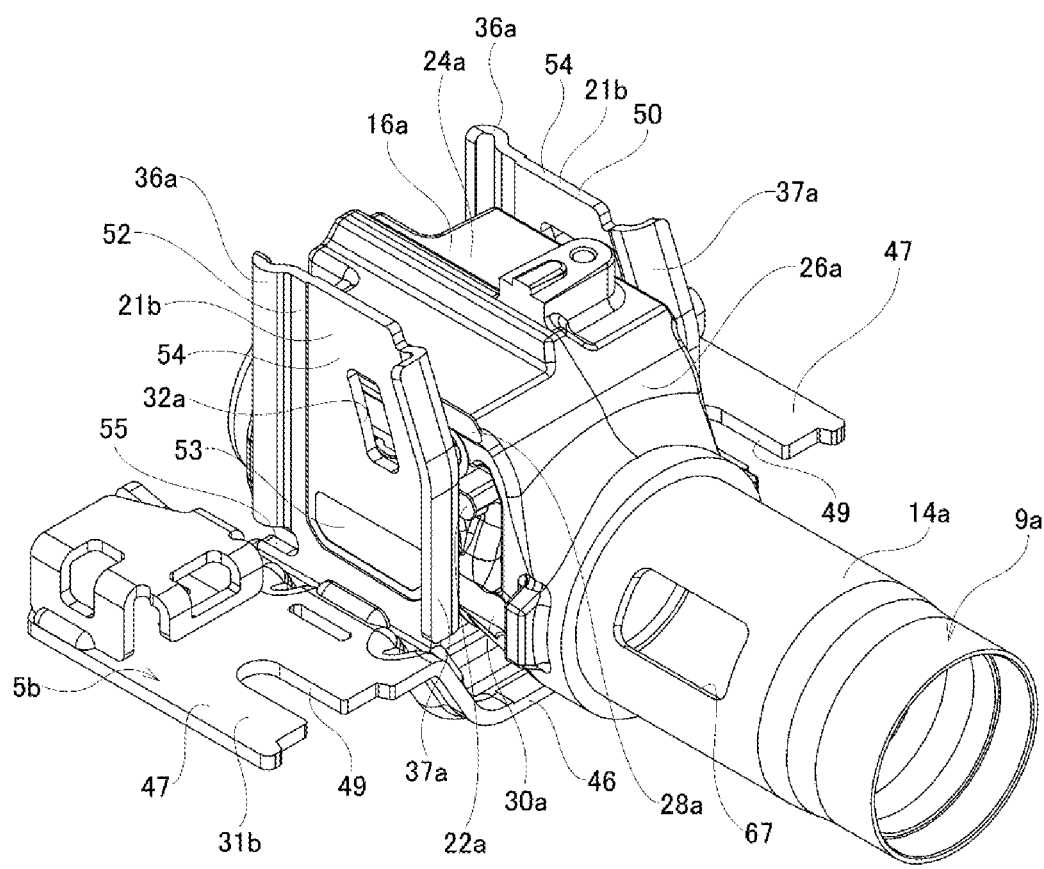
FIG. 6 is a perspective view of the inner column, the outer column and the upper bracket of the first example as viewed from the lower rear side.

As illustrated in FIG. 3, the adjustment rod 33a is arranged in the width direction so as to be inserted through the long hole for telescopic adjustment 27a and the tilt adjusting long holes 32a in the width direction. The adjustment rod 33a includes a head portion 56 in one end portion (left end portion in FIG. 3) thereof, and includes a male screw portion 57 in the other end portion (right end portion in FIG. 3) thereof. An adjusting lever 34a and the cam device 35a are arranged in that order from the outside in the width direction around a portion on the one end side of the adjustment rod 33a that protrudes from the outside surface in the width direction of one (left one in FIG. 3) of the pair of support plate portions 21b, in other words, between the head portion 56 and the outside surface in the width direction of the one support plate portion 21b. A nut 58, a thrust bearing 59, and the pressing plate 60 are arranged in that order from the outside in the width direction around a portion on the other end side of the adjustment rod 33a that protrudes from the outside surface in the width direction of the other (right one in FIG. 30) of the pair of support plate portions 21b. The nut 58 is screwed into the male screw portion 57, which is formed on the other end portion of the adjusting rod 33a.

In the steering device 1a of this example, an expansion/contraction device is configured by the adjusting lever 34a and the cam device 35a, and by swinging the adjusting lever 34a to expand or contract a dimension in the axial direction of the cam device 35a, the interval between the inside surfaces in the width direction of the pair of support plate portions 21b can be expanded or contracted. Due to this, the magnitude of the clamping force to the outer column 9a by the pair of support plate portions 21b is adjusted.

The cam device 35a is configured by a combination of a drive-side cam 61 and the driven-side cam 62. The drive-side cam 61 is arranged outside in the width direction, and the driven-side cam 62 is arranged inside in the width direction. The base end portion of the adjustment lever 34a is fixed to the drive-side cam 61 so that relative rotation is not possible.

Both the drive-side cam 61 and the driven-side cam 62 are made of sintered metal, and have an annular plate shape. The drive-side cam 61 includes a drive-side cam surface 63, which is a concave and convex surface with respect to the circumferential direction, on the inside surface in the width direction (right side surface in FIG. 3). The driven-side cam 62 includes a driven-side cam surface 64, which is a concave and convex surface with respect to the circumferential direction, on the outside surface in the width direction (left side surface in FIG. 3). The driven-side cam 62 includes an engaging convex portion 65, which has a substantially rectangular plate shape and protrudes inward in the width direction, on the inside surface in the width direction. The engaging convex portion 65 of the driven-side cam 62 engages with the tilt adjusting long hole 32a of the one support plate portion 21b so as to be able to displace only along the tilt adjusting long hole 32a.

A pair of tension springs 66 is arranged on both sides in the width direction of the pair of support plate portions 21b. One of the pair of tension springs 66 is bridged between one side plate portion 47 and the base end portion of the adjustment lever 34a, and the other tension spring 66 is bridged between the other side plate portion 47 and the pressing plate 60. When releasing the clamping force, the pair of tension springs 66 prevents the steering column 3a from tilting such that the steering wheel 38 falls quickly.

In the steering device 1a of this example, a steering lock device serving as a type of a vehicle anti-theft device is assembled. A locking through hole 67 is provided in the cylindrical portion 14a of the outer column 9a. A lock unit, which is not illustrated, is supported by and fixed to the vicinity of the locking through hole 67, and a key lock collar, which is not illustrated, is press-fitted to a portion of the steering shaft 2a that coincides with the lock unit in the front-rear direction. When an ignition key is switched off, the tip-end portion of a lock pin of the lock unit displaces toward the inside in the radial direction, and engages with a key lock concave portion that is provided on the outer-circumferential surface of the key lock collar. As a result, the steering shaft 2*a* cannot be substantially rotated.

In the steering device 1*a* of this example, when holding the steering wheel 38 at a desired position, the steering wheel 38 is moved to a desired position, and then the adjustment lever 34*a* is rotated about the adjustment rod 33*a* in a specified direction (for example, upward). Due to this, the convex portion of the drive-side cam surface 63 and the convex portion of the driven-side cam surface 64 are brought in contact with each other, and thus the dimension in the axial direction of the cam device 35*a* is increased, so that the interval between the inside surfaces in the width direction of the pair of support plate portions 21*b* is reduced. At this time, the inside surfaces in the width direction of the pair of support plate portions 21*b* press the first tightened surfaces 22*a*, the second tightened surfaces 28*a*, and the third tightened surfaces 30*a*. The intermediate portions in the vertical direction of the support plate portions 21*b* and the pair of clamped portions 20*a* are elastically deformed toward the inside in the width direction, and thus sandwich the outer-circumferential surface of the inner column 8*a* from both sides in the width direction. As a result, the steering wheel 38 is held at the adjusted position.

When adjusting the position of the steering wheel 38, the adjustment lever 34*a* is swung in a direction opposite to the specified direction (for example, downward). Due to this, the convex portion of the drive-side cam surface 63 and the convex portion of the driven-side cam surface 64 are alternately arranged in the circumferential direction, and thus the dimension in the axial direction of the cam device 35*a* is reduced, so that the interval between the inside surfaces in the width direction of the pair of support plate portions 21*b* is increased. As a result, because a pressing force due to the pair of support plate portions 21*b* is reduced, the pair of clamped portions 20*a* are elastically restored, so that a force for holding the outer-circumferential surface of the inner column 8*a* by the pair of support plate portions 21*b* is reduced. At this time, it is possible to adjust the front-rear position and the vertical position of the steering wheel 38 within a range in which the adjusting rod 33*a* is able to move inside the long hole for telescopic adjustment 27*a* and the tilt adjusting long holes 32*a*.

Especially, in the steering device 1*a* of this example, the support rigidity in the width direction of outer column 9*a* when supported by the upper bracket 5*b* is improved. In other words, in this example, the pair of support plate portions 21*b* of the upper bracket 5*b* include the auxiliary stepped portions 54 and the stepped portions 53, which project toward the inside in the width direction. As illustrated in FIG. 19(A) to FIG. 20(C), regardless of the support position (position in the vertical direction and position in the front-rear direction) of the outer column 9*a* with respect to the upper bracket 5*b*, the inside surfaces in the width direction of the stepped portions 53 always face the third tightened surfaces 30*a*. Due to this, when the adjustment lever 34*a* is rotated about the adjustment rod 33*a* in the specified direction to hold the steering wheel 38 at the desired position, regardless of the support position of the outer column 9*a* with respect to the upper bracket 5*b*, the inside surfaces in the width direction of the stepped portions 53 are always in contact with the third tightened surfaces 30*a*.

Specifically, when the dimension in the axial direction of the cam device 35*a* is increased by operating the adjustment lever 34*a*, the pair of support plate portions 21*b* is inclined in a direction further inward in the width direction as going toward the lower side, until the inside surfaces in the width direction of the auxiliary stepped portions 54 are brought in contact with the second tightened surfaces 28*a*. When the dimension in the axial direction of the cam device 35*a* is further increased, each of the pair of support plate portions 21*b* tends to be bent and deformed with a contact portion of the inside surface in the width direction of the auxiliary stepped portion 54 to the first tightened surface 22*a* as a fulcrum such that a portion of the support plate portion 21*b* including the stepped portion 53 that faces the third tightened surface 30*a* opens outward in the width direction. At this time, in this example, because the stepped portion 53 projecting toward the inside in the width direction is provided in an area that faces the third tightened surface 30*a* in the width direction, the inside surface in the width direction of the stepped portion 53 can be brought in contact with the third tightened surface 30*a*. Therefore, it is possible to prevent a gap from generating between the third tightened surface 30*a* and the inside surface in the width direction of each of the pair of support plate portions 21*b*. Accordingly, the support rigidity in the width direction of the outer column 9*a* when supported by the upper bracket 5*b* is improved.

In this example, the stepped portion 53 is arranged in a portion in which the auxiliary stepped portion 54 is provided, so that the inside surface in the width direction of each of the pair of support plate portions 21*b* has a structure that projects toward the inside in the width direction in two steps. Due to this, it is possible to prevent the plate thickness of each of the pair of support plate portions 21*b* from being excessively reduced in part, compared to the case where the auxiliary stepped portion is not provided and only the stepped portion is provided so that the stepped portion projects by the same amount (H1+H2) as this example. Specifically, although the plate thickness of each of the pair of support plate portions 21*b* is reduced in areas where surface-level differences exist, because the surface-level differences are provided in two steps in this example, the degree to which the plate thickness is partially reduced is suppressed. From this aspect as well, the rigidity of the pair of support plate portions 21*b* is secured.

The upper-end portions of the front-side reinforcing portion 36*a* and the rear-side reinforcing portion 37*a*, which are respectively provided in the front-end and rear-end portions of each of the pair of support plate portions 21*b*, each have a free end and are not connected to the bridge portion 46. Therefore, it is possible to prevent each of the pair of support plate portions 21*b* from becoming hard to be bent and deformed toward the inside in the width direction due to providing the front-side reinforcing portion 36*a* and the rear-side reinforcing portion 37*a*. The lug portion for welding 51, which is provided in the upper-end portion of each of the pair of support plate portions 21*b*, is fixed by welding to the lower surface of the outside portion in the width direction of the bridge portion 46. The rigidity of the bridge portion 46 is higher than the rigidity of the side plate portions 47. Due to this, even when the side plate portion 47 or the mounting surface of the vehicle body 6 does not have a sufficiently high degree of precision, the degree of precision is prevented from affecting the pair of support plate portions 21*b*.

In this example, there are separately and independently provided the first tightened surfaces 22*a* for elastically deforming the pair of clamped portions 20*a*, and the second tightened surfaces 28*a* and the third tightened surfaces 30*a* for transmitting a torque, which is applied to the outer column 9*a* when, for example, the steering wheel 38 is operated with a large force in a state where a steering lock device is activated, to the inside surfaces in the width direction of the support plate portions 21b of the upper bracket 5b. That is, the first tightened surfaces 22a are not required to have a function to transmit the torque to the inside surfaces in the width direction of the support plate portions 21b. Due to this, the pair of clamped portions 20a is only required to exhibit a function to sandwich the inner column 8a, so that it is not necessary to secure an excessive strength. Accordingly, the pair of clamped portions 20a can be largely bent in the width direction. On the other hand, the second tightened surfaces 28a and the third tightened surfaces 30a are not required to be largely bent in the width direction, and are only required to exhibit a function to transmit the torque. As a result, in the steering device 1a of this example, securing strength of the outer column 9a is compatible with securing the holding force of the inner column 8a.

In this example, in a state where the pair of clamped portions 20a is bent by the inside surfaces in the width direction of the pair of support plate portions 21b, the inside surfaces of the auxiliary stepped portions 54 of the pair of support plate portions 21b are brought in contact with the second tightened surfaces 28a and the third tightened surfaces 30a having high rigidity with respect to the width direction. As a result, the support rigidity of the outer column 9a when supported by the pair of support plate portions 21b is enhanced.

First Reference Example

Figure 22:
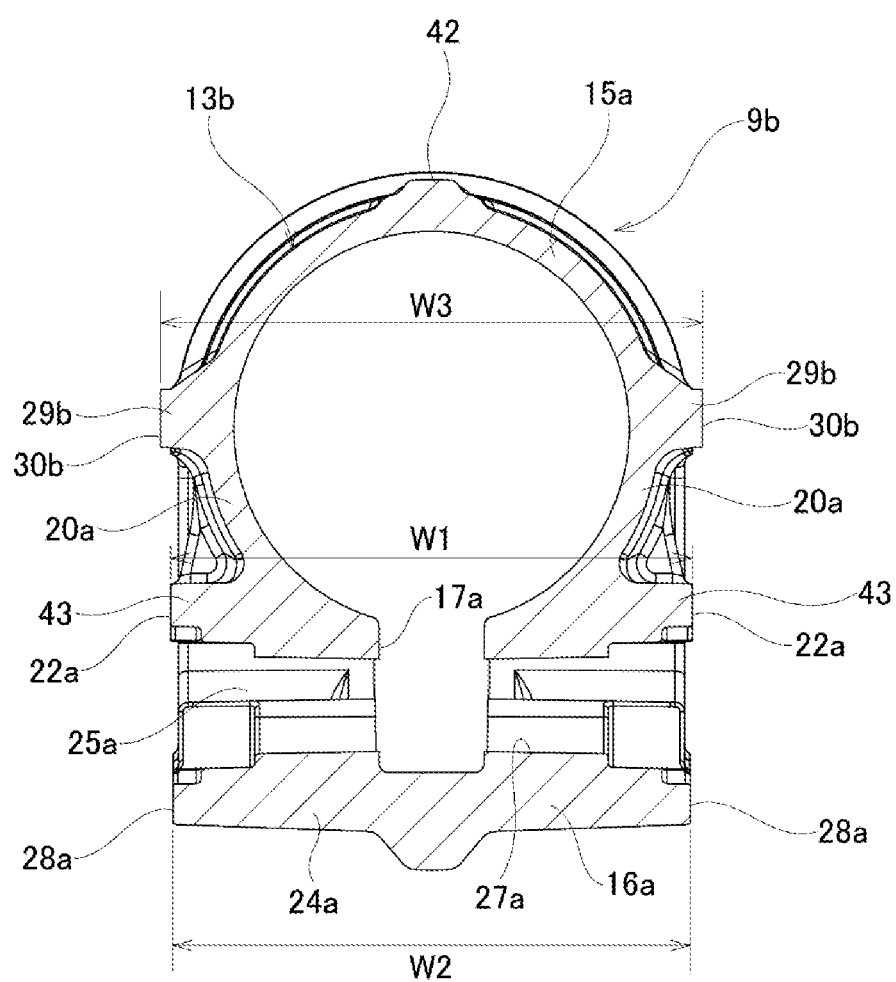
FIG. 22 is a view illustrating a first reference example, which corresponds to FIG. 8.
Figure 26:
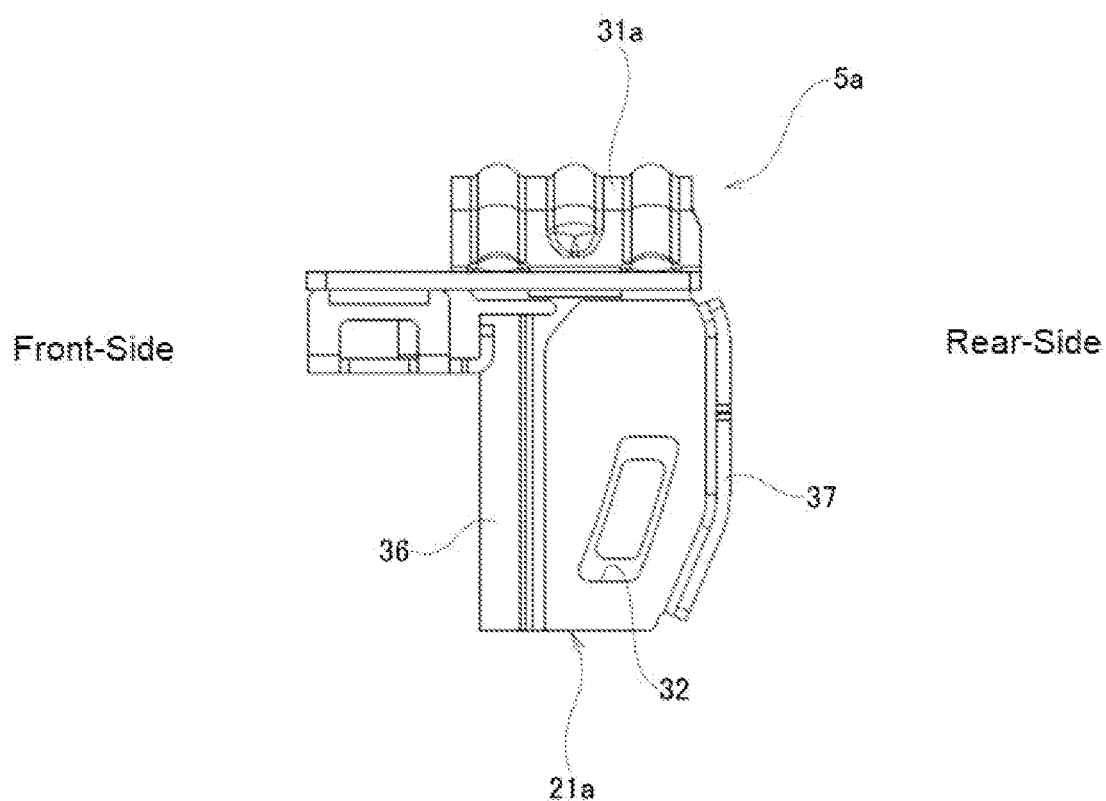
FIG. 26 is a side view illustrating an upper bracket with reinforcing portions of the steering device with a conventional structure.
Figure 27:
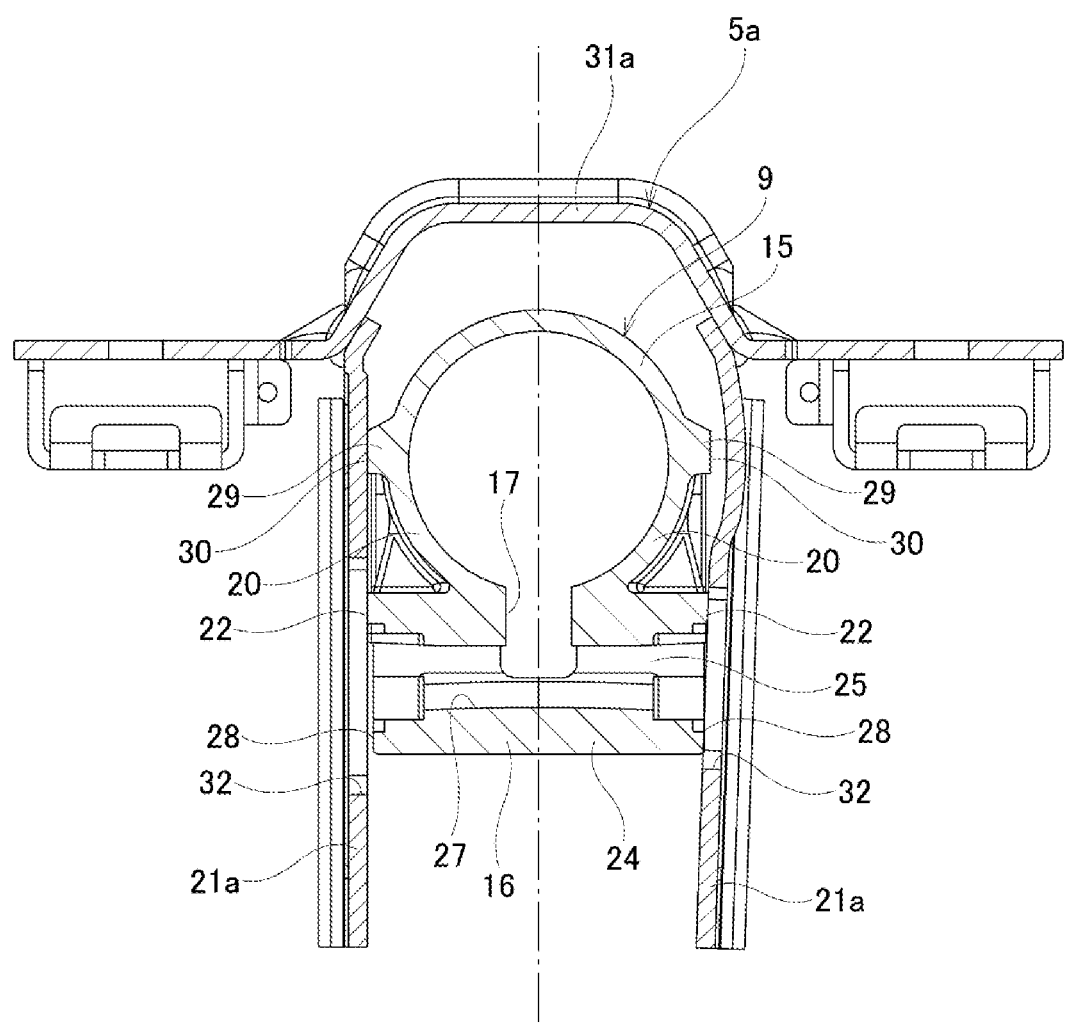
FIG. 27 is a cross-sectional view for describing deformation generated in a pair of support plate portions of the upper bracket, the left half section illustrating one support plate portion of the pair of support plate portions in a state before being deformed, the right half section illustrating the other support plate portion in a state after being deformed.

A first reference example will be described using FIG. 22. In this reference example, while the structure of the sandwiched portion 13b of the outer column 9b is devised, each of the pair of support plate portions 21a (not illustrated) of the upper bracket 5a has a flat plate shape without any stepped portion as similar to the conventional structure illustrated in FIG. 26. In other words, the pair of support plate portions 21a has inside surfaces in the width direction respectively having a flat surface shape.

In this reference example, the amount of protrusion toward the outside in the width direction of the protruding portions 29b, which are provided in the column body portion 15a, is larger compared to the first example of an embodiment of the present invention. Due to this, as illustrated in FIG. 22, in a state where a pressing force is not applied from the support plate portions 21a (see FIG. 26) to the sandwiched portion 13b, an interval W1 in the width direction between the first tightened surfaces 22a, an interval W2 in the width direction between the second tightened surfaces 28a, and an interval W3 in the width direction between the third tightened surfaces 30b satisfy a relation of W3>W1>W2. Due to this, on both sides in the width direction, the third tightened surfaces 30b are located further outward in the width direction than the first tightened surfaces 22a and the second tightened surfaces 28a.

In this reference example, the inside surfaces in the width direction of the pair of support plate portions 21a, which respectively have a flat surface shape, are able to be brought in contact with the third tightened surfaces 30b. Accordingly, the support rigidity in the width direction of the outer column 9b when supported by the upper bracket 5a is enhanced. The configuration and operational effects of other parts thereof are the same as those of the first example of an embodiment of the present invention.

When embodying the present invention, shapes of the front-side reinforcing portion and the rear-side reinforcing portion are not limited to those illustrated in the embodiment, and it is possible to employ other shapes such as those described in JP 2017-197178(A) as long as the cross-sectional modulus of the support plate portion can be enhanced. Also, in the first example of an embodiment of the present invention, a structure of two-step projection toward the inside in the width direction is employed in which the auxiliary stepped portion is provided in the support plate body of each of the pair of support plate portions, and the stepped portion is arranged in the auxiliary stepped portion. However, when embodying the present invention, a structure of one-step projection toward the inside in the width direction may be employed in which the auxiliary stepped portion is omitted and only the stepped portion is provided. A structure of projection in three steps or more may be employed. Also, ranges in which the auxiliary stepped portion and the stepped portion are formed are not limited to those described in the first example of an embodiment of the present invention, and are able to be appropriately modified. Also, in the first example of an embodiment of the present invention, a structure is employed in which the stepped portion is provided in each of the pair of support plate portions of the support bracket. However, when embodying the present invention, the stepped portion may be provided in at least one support plate portion of the pair of support plate portions, and the other support plate portion may have a flat plate shape without any stepped portion. Furthermore, when embodying the present invention, it is possible to appropriately combine the structure of the first example of an embodiment of the present invention and the structure of the reference example.

REFERENCE SIGNS LIST 1, 1a Steering device
2, 2a Steering shaft
3, 3a Steering column
4, 4a Lower bracket
5, 5a, 5b Upper bracket
6 Vehicle body
7, 7a Electric assist device
8, 8a Inner column
9, 9a, 9b Outer column
10, 10a Inner shaft
11, 11a Outer shaft
12, 12a Tilt shaft
13, 13a, 13b Sandwiched portion
14, 14a Cylindrical portion
15, 15a Column body portion
16, 16a Reinforcing bridge portion
17, 17a Front-rear direction slit
18, 18a Front-side circumferential-direction slit
19, 19a Rear-side circumferential-direction slit
20, 20a Clamped portion
21, 21a, 21b Support plate portion
22, 22a First tightened surface
23, 23a Gap
24, 24a Bottom plate portion
25, 25a Front-side connecting portion
26, 26a Rear-side connecting portion
27, 27a Long hole for telescopic adjustment
28, 28a Second tightened surface
29, 29a, 29b Protruding portion
30, 30a, 30b Third tightened surface
31, 31a, 31b Mounting plate portion
32, 32a Tilt adjusting long hole
33, 33a Adjustment rod
34, 34a Adjustment lever 35, 35a Cam device
36, 36a Front-side reinforcing portion
37, 37a Rear-side reinforcing portion
38 Steering wheel
39 Gear housing
40 Thin-walled portion
41a, 41b Thick-walled portion
42 Upper-side rib
43 Projecting plate portion
44 Horizontal-side rib
45 Locking capsule
46 Bridge portion
47 Side plate portion
48 Bracket rib
49 Locking notch
50 Support plate body
51 Lug portion for welding
52 Base plate portion
53 Stepped portion
54 Auxiliary stepped portion
55 Slit
56 Head portion
57 Male screw portion
58 Nut
59 Thrust bearing
60 Pressing plate
61 Drive-side cam
62 Driven-side cam
63 Drive-side cam surface
64 Driven-side cam surface
65 Engaging convex portion
66 Tension spring
67 Locking through hole

The invention claimed is:

1. A steering device comprising:
an inner column;
an outer column arranged on a rear side of the inner column and externally fitted onto the inner column so that relative displacement is possible in an axial direction; and
a support bracket having a mounting plate portion, and a pair of support plate portions each having an upper end portion fixed to a lower surface of the mounting plate portion, the pair of support plate portions arranged on both sides in a width direction of the outer column;
the outer column including a pair of clamped portions arranged on both sides in the width direction of the inner column and configured to sandwich the inner column from both sides in the width direction due to elastic deformation in the width direction, and first tightened surfaces, second tightened surfaces, and third tightened surfaces configured to receive a tightening force from inside surfaces in the width direction of the pair of support plate portions;
the first tightened surfaces arranged on outside surfaces in the width direction of the pair of clamped portions;
the second tightened surfaces arranged on both sides in the width direction of a portion of the outer column that is located below the first tightened surfaces and has higher rigidity with respect to the width direction than the pair of clamped portions;
the third tightened surface arranged on both sides in the width direction of a portion of the outer column that is located above the first tightened surfaces and has higher rigidity with respect to the width direction than the pair of clamped portions;
a width dimension between the first tightened surfaces and a width dimension between the third tightened surfaces being equal to each other and larger than a width dimension between the second tightened surfaces; and
at least one support plate portion of the pair of support plate portions including reinforcing portions arranged on both end portions in a front-rear direction thereof, the reinforcing portions extending in a vertical direction and each having a free end on an upper end portion thereof, and a stepped portion arranged in an intermediate portion in the front-rear direction thereof, the stepped portion having a concave shape on an outer side in the width direction, a convex shape on an inner side in the width direction, and an inside surface in the width direction facing the third tightened surface and configured to be brought in contact with only the third tightened surface.

2. The steering device according to claim 1, wherein both the pair of support plate portions include the reinforcing portions and the stepped portion.

3. The steering device according to claim 1, wherein the at least one support plate portion includes an auxiliary stepped portion that is arranged in the intermediate portion in the front-rear direction, and that has a concave shape on the outer side in the width direction and a convex shape on the inner side in the width direction, and the stepped portion is provided in a part of the auxiliary stepped portion.

4. The steering device according to claim 1, wherein the outer column includes a long hole for telescopic adjustment that is located between the first tightened surfaces and the second tightened surfaces and extends in the front-rear direction, and the pair of support plate portions each includes a tilt adjusting long hole that extends in the vertical direction, an adjustment rod is inserted through the long hole for telescopic adjustment and the tilt adjusting long holes in the width direction, the outer column is configured to move in the vertical direction and the front-rear direction with respect to the support bracket within a range where the adjustment rod is able to move inside the long hole for telescopic adjustment and the tilt adjusting long holes, and the inside surface in the width direction of the stepped portion is arranged so as to be able to be brought in contact with the third tightened surface, regardless of a support position of the outer column with respect to the support bracket.

* * * * *